(12) United States Patent
Katoh et al.

(10) Patent No.: US 7,707,822 B2
(45) Date of Patent: May 4, 2010

(54) CYLINDER AIR-FUEL RATIO CONTROLLER FOR INTERNAL COMBUSTION ENGINE

(75) Inventors: Tatsunori Katoh, Aichi-gun (JP); Yuuki Sakamoto, Kariya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/819,657

(22) Filed: Jun. 28, 2007

(65) Prior Publication Data
US 2008/0035132 A1 Feb. 14, 2008

(30) Foreign Application Priority Data

| Aug. 8, 2006 | (JP) | ............................... 2006-215167 |
| Sep. 11, 2006 | (JP) | ............................... 2006-246006 |
| Sep. 11, 2006 | (JP) | ............................... 2006-246007 |

(51) Int. Cl.
*F01N 3/00* (2006.01)
(52) U.S. Cl. ............................... 60/277; 60/274; 60/285
(58) Field of Classification Search ................... 60/276, 60/277, 285, 299, 274
See application file for complete search history.

(56) References Cited

U.S. PATENT DOCUMENTS

| 4,690,116 | A | * | 9/1987 | Takahashi | ............... | 123/406.16 |
| 5,072,700 | A | * | 12/1991 | Kawamura | ............... | 123/90.11 |
| 5,131,372 | A | | 7/1992 | Nakaniwa | | |
| 5,623,913 | A | * | 4/1997 | Kitajima et al. | ............. | 123/673 |
| 6,273,075 | B1 | * | 8/2001 | Choi et al. | ................... | 123/673 |
| 7,051,725 | B2 | | 5/2006 | Ikemoto et al. | | |
| 7,121,258 | B2 | * | 10/2006 | Nakamoto et al. | .......... | 123/399 |
| 7,249,454 | B2 | * | 7/2007 | Ichise et al. | ................... | 60/285 |

FOREIGN PATENT DOCUMENTS

| JP | 56-020727 | | 2/1981 |
| JP | 01-237336 | | 9/1989 |
| JP | 2003184624 | * | 7/2003 |

OTHER PUBLICATIONS

U.S. Appl. No. 11/819,652, filed Jun. 28, 2007, Katoh.

* cited by examiner

*Primary Examiner*—Thomas E Denion
*Assistant Examiner*—Diem Tran
(74) *Attorney, Agent, or Firm*—Nixon & Vanderhye P.C.

(57) ABSTRACT

An air-fuel ratio of each cylinder is estimated on the basis of a detection value of an air-fuel ratio sensor disposed in an exhaust confluent portion. An air-fuel ratio correction quantity is computed on the basis of the estimated air-fuel ratio of each cylinder. The air-fuel ratio of an air-fuel mixture to be supplied to each cylinder is corrected on the basis of the cylinder air-fuel ratio correction quantity to reduce a variation in the air-fuel ratio between the cylinders. When a state in which the cylinder air-fuel ratio correction quantity or its learning value of any cylinder is outside a specified range continues for a while during a period in which this cylinder air-fuel ratio control is performed, a combustion is stopped for the cylinder outside the specified range and the cylinder air-fuel ratio control is continuously performed only for other normal cylinders.

4 Claims, 17 Drawing Sheets

START → READ SENSOR OUTPUT (201) → ESTIMATE A/F RATIO (202) → COMPUTE REFERENCE A/F RATIO (203) → COMPUTE AFCQ (204) → LEARNING OF AFCQ (205) → CORRECT FUEL INJECTION QUANTITY (206) → RETURN

START → COMBUSTION STOP FLAG=ON? (501)
- NO → RETURN
- YES → READ DATA (502) → CUT INJECTION & IGNITION (503) → CLOSE INTAKE/EXHAUST VALVES (504) → RETURN

CYLINDER AIR-FUEL RATIO CONTROLLER FOR INTERNAL COMBUSTION ENGINE

CROSS-REFERENCE TO RELATED APPLICATION

This application is based on Japanese Patent Applications No. 2006-215167 filed on Aug. 8, 2006, No. 2006-246006 filed on Sep. 11, 2006, and No. 2006-246007 filed on Sep. 11, 2006, the disclosure of which are incorporated herein by reference.

FIELD OF THE INVENTION

The present invention relates to a cylinder air-fuel ratio controller for an internal combustion engine having a function for estimating an air-fuel ratio of each cylinder (cylinder air-fuel ratio) on the basis of the detection value of an air-fuel ratio sensor disposed in an exhaust confluent portion into which exhaust gas from a plurality of cylinders flows.

BACKGROUND OF THE INVENTION

JP-A-2005-207405 (U.S. Pat. No. 7,051,725 B2) shows a cylinder air-fuel ratio control system including the controller. In this system, air-fuel ratios of a plurality of cylinders are estimated for the respective cylinders on the basis of the output of one air-fuel ratio sensor disposed in an exhaust confluent portion where exhaust gas from the plurality of cylinders joins, air-fuel ratio correction quantities of the respective cylinders (cylinder air-fuel ratio correction quantities) for correcting variations in an air-fuel ratio between the cylinders are computed for the respective cylinders, the cylinder air-fuel ratio correction quantities are learned by smoothing processing or the like, and cylinder air-fuel ratio control for controlling the air-fuel ratios (fuel injection quantities) of the plurality of cylinders for the respective cylinders is performed on the basis of the cylinder air-fuel ratio correction quantities and their learning values. Further, in this cylinder air-fuel ratio control system, on operating condition that the estimation of the cylinder air-fuel ratio is difficult (the computation of the cylinder air-fuel ratio is difficult), the cylinder air-fuel ratio control is performed by the use of the learning values of the cylinder air-fuel ratio correction quantities.

In this cylinder air-fuel ratio control system, there may be a case where, for example, if the fuel injection valve or the like of any cylinder becomes abnormal and the control of the air-fuel ratio of the cylinder becomes difficult, variations in the air-fuel ratio between the cylinders becomes abnormally large and the cylinder air-fuel ratio correction quantity and its learning value become abnormally large. Even if the cylinder air-fuel ratio control is continuously performed in this state, variations in the air fuel ratio between the cylinders cannot be reduced, which results in excessively correcting the air fuel ratio of the normal cylinders other than the abnormal cylinder and hence raises a problem that exhaust emission deteriorates.

Moreover, in the foregoing cylinder air-fuel ratio control system, there may be a case where when the air-fuel ratio control becomes difficult for any cylinder because of the failure of the fuel injection valve or the like, the air-fuel ratio of the abnormal cylinder for which the air-fuel ratio control becomes difficult is greatly varied in a lean direction. As a result, the air-fuel ratio of exhaust gas flowing into a catalyst (in other words, exhaust gas of a mixture of exhaust gas of the abnormal cylinder and exhaust gas of the normal cylinders) can be shifted in the lean direction. If the air-fuel ratio of exhaust gas flowing into the catalyst is shifted in the lean direction, the quantity of lean component (oxygen quantity) flowing into the catalyst is increased to accelerate oxidation reaction of rich components such as HC and CO to raise a possibility that the catalyst may be overheated and failed by the reaction heat.

Moreover, to prevent a catalyst for cleaning the exhaust gas of an internal combustion engine from being failed by overheat, there is proposed an apparatus as described in JP-A-56-20727 which controls an air-fuel ratio in a direction to decrease the temperature of the catalyst when the catalyst is determined to be overheated.

When the catalyst is determined to be overheated, if the air-fuel ratio of each cylinder is controlled by the use of this apparatus in a direction to decrease the temperature of the catalyst, there are raised the following problems: because the air-fuel ratio of the abnormal cylinder for which the air-fuel ratio control is difficult cannot be controlled with high accuracy in the direction to decrease the temperature of the catalyst, it is difficult to control the air-fuel ratio of exhaust gas (in other words, exhaust gas of a mixture of exhaust gas of the abnormal cylinder and exhaust gas of normal cylinders) with high accuracy in a direction to decrease the temperature of the catalyst; and because the air-fuel ratio of each cylinder is controlled in the direction to decrease the temperature of the catalyst after the catalyst is determined to be overheated, it is impossible to prevent the catalyst from being overheated before the catalyst is overheated.

SUMMARY OF THE INVENTION

The present invention has been made in view of these circumstances. An object of the present invention is to provide a cylinder air-fuel ratio controller for an internal combustion engine that prevents the air-fuel ratios of normal cylinders other than an abnormal cylinder from being excessively corrected by the effect of the abnormal cylinder even when the abnormal cylinder is developed, the abnormal cylinder being a cylinder for which air-fuel ratio control is difficult, and at the same time continuously performs an air-fuel ratio control and hence prevents an exhaust emission from being impaired.

Further, another object of the present invention is to provide a cylinder air-fuel ratio controller for an internal combustion engine that prevents a catalyst from being overheated by the development of a cylinder in which an air-fuel ratio is abnormal.

According to the present invention, a cylinder air-fuel ratio controller for an internal combustion engine including an estimation means for estimating an air-fuel ratio of each cylinder based on a detection value of an air-fuel ratio sensor disposed in an exhaust confluent portion into which an exhaust gas from a plurality of cylinder of the internal combustion engine flows. The air-fuel ratio sensor detects an air-fuel ratio of the exhaust gas. The controller includes a computation means for computing a cylinder air-fuel ratio correction quantity of each cylinder for correcting a variation in the air-fuel ratio between the plurality of cylinders for each cylinder, and a control means for performing cylinder air-fuel ratio control for correcting a fuel injection quantity of each cylinder on the basis of the cylinder air-fuel ratio correction quantity to reduce the variation in the air-fuel ratio between the cylinders. The controller further includes a combustion stop means for stopping a combustion in any cylinder when a cylinder air-fuel ratio correction quantity or its learning value of the cylinder, which is referred to as an abnormal cylinder, is outside a specified range.

With this, even if an abnormal cylinder for which air-fuel ratio control is difficult is developed, the cylinder air-fuel ratio control can be continuously performed only for normal cylinders other than the abnormal cylinder. Thus, while the air-fuel ratios of the other normal cylinders can be prevented from being excessively corrected by the effect of the abnormal cylinder for which air-fuel ratio control is difficult, the cylinder air-fuel ratio control can be continuously performed only for the normal cylinders. Therefore, it is possible to prevent exhaust emission from being impaired.

Moreover, a controller according to the present invention includes an air-fuel ratio detection means for estimating or measuring a cylinder air-fuel ratio of each cylinder on the basis of an output of an air-fuel ratio sensor detecting an air-fuel ratio of exhaust gas, a catalyst disposed downstream of the air-fuel ratio sensor, an abnormal cylinder determination means for determining on the basis of the cylinder air-fuel ratio whether an abnormal cylinder in which an air-fuel ratio is abnormal exists. The controller further includes a limited operation control means for performing a limited operation control in which an output and/or a revolution speed of the internal combustion engine is limited when the abnormal cylinder determination means determines that the abnormal cylinder exists.

In this construction, when it is determined that the abnormal cylinder is developed, the limited operation control for limiting the output and the revolution speed of the internal combustion engine is performed. Thus, even if the air-fuel ratio of the exhaust gas flowing into the catalyst is shifted in a lean direction (in a direction to increase an oxygen quantity flowing into the catalyst to accelerate oxidation reaction) by the development of the abnormal cylinder, the exhaust gas quantity (oxygen quantity) flowing into the catalyst can be limited by limiting the output and the revolution speed of the internal combustion engine, whereby reaction heat can be suppressed in such a way as to prevent the catalyst from being overheated (being damaged by the heat). Therefore, it is possible to prevent the catalyst from being overheated by the development of the abnormal cylinder.

Furthermore, a controller according to the present invention includes an air-fuel ratio detection means for estimating or measuring a cylinder air-fuel ratio of each cylinder on the basis of an output of an air-fuel ratio sensor, a catalyst disposed downstream of the air-fuel ratio sensor, an abnormal cylinder determination means for determining whether an abnormal cylinder in which an air-fuel ratio is abnormal exists, and a catalyst overheat determination means for determining whether the catalyst is likely to be overheated when the abnormal cylinder determination means determines that the abnormal cylinder exists. The controller further includes a catalyst overheat prevention means for controlling an air-fuel ratio of a normal cylinder other than the abnormal cylinder in such a way that an air-fuel ratio of the exhaust gas flowing into the catalyst becomes close to a stoichiometric air-fuel ratio or a rich air-fuel ratio when the catalyst overheat determination means determines that the catalyst is likely to be overheated.

In this construction, when it is determined that the abnormal cylinder is developed and it is determined that the catalyst is likely to be overheated, the air-fuel ratios of the normal cylinders (for which air-fuel ratios can be normally controlled) can be controlled in a rich direction in a state in which the air-fuel ratio of the abnormal cylinder (for which air-fuel ratio control is difficult) is fixed. Thereby, the air-fuel ratio of the exhaust gas flowing into the catalyst can be controlled close to a stoichiometric air-fuel ratio or a rich air-fuel ratio (in other words, in a direction to lower the temperature of the catalyst). Hence, the air-fuel ratio of the exhaust gas flowing into the catalyst can be controlled quickly and with high accuracy in a direction to lower the temperature of the catalyst. Therefore, it is possible to prevent the catalyst from being overheated and to enhance the effect of preventing the catalyst from being overheated.

DETAILED DESCRIPTION OF THE PREFERRED EMBODIMENTS

Figure 1:
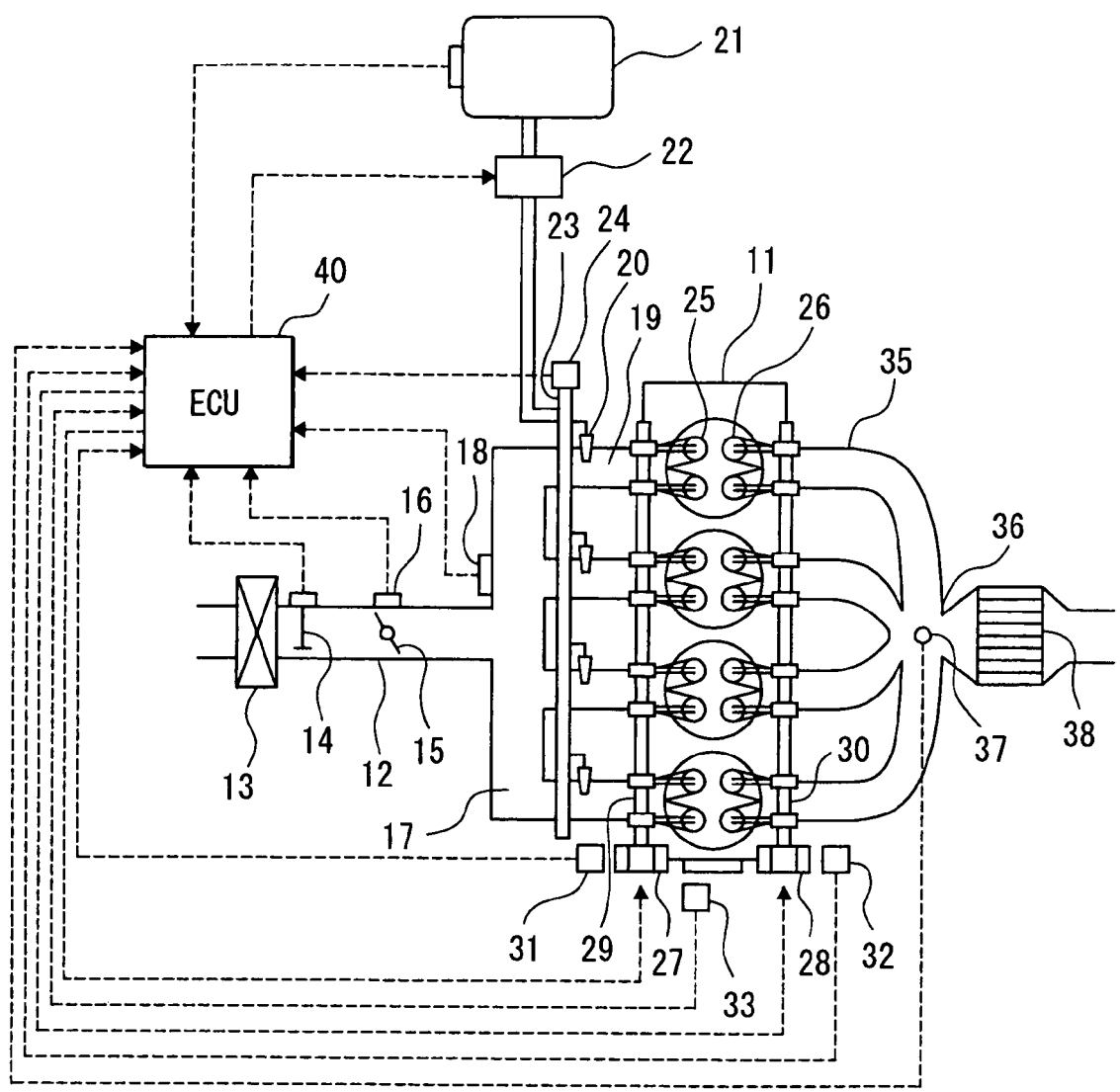
FIG. 1 is a schematic view showing an engine control system according to a first embodiment of the present invention.

The several embodiments embodying the best mode for carrying out the present invention will be described below.

First Embodiment

A first embodiment of the present invention will be described with reference to FIG. 1 to FIG. 9.

An air cleaner 13 is disposed upstream of an intake pipe 12 of an internal combustion engine, for example, an in-line four-cylinder engine 11. An air flow meter 14 for detecting an intake air quantity is disposed downstream of the air cleaner 13. A throttle valve 15 having its opening controlled by a motor or the like and a throttle position sensor 16 for detecting a throttle opening are disposed downstream of the air flow meter 14.

Moreover, a surge tank 17 is disposed downstream of the throttle valve 15. The surge tank 17 is provided with an intake pipe pressure sensor 18 for detecting an intake pipe pressure. Further, the surge tank 17 is provided with intake manifolds 19 for introducing air into the respective cylinders of the engine 11. Fuel injection valves 20 for injecting fuel are secured near the intake ports of the intake manifolds 19 of the respective cylinders, respectively. While the engine 11 is operated, fuel in a fuel tank 21 is sent to a delivery pipe 23 by a fuel pump 22 and is injected from the fuel injection valves 20 of the respective cylinders at injection timings of the respective cylinders. The delivery pipe 23 is provided with a fuel pressure sensor 24 for detecting the pressure of the fuel (fuel pressure).

Moreover, the engine 11 is provided with variable valve timing mechanisms 27, 28 for varying the opening and closing timings of intake valves 25 and exhaust valves 26, respectively. Further, the engine 11 is provided with an intake cam angle sensor 31 that outputs a cam angle signal in synchronization with the rotation of an intake camshaft 29 and an exhaust cam angle sensor 32 that outputs a cam angle signal in synchronization with the rotation of an exhaust camshaft 30. Still further, the engine 11 is provided with a crank angle sensor 33 for outputting a crank angle signal pulse at intervals of a specified crank angle (for example, 30° CA) in synchronization with the rotation of a crankshaft of the engine.

On the other hand, an air-fuel ratio sensor 37 for detecting the air-fuel ratio of exhaust gas is disposed in an exhaust gas join portion 36 where the exhaust manifolds 35 of the respective cylinders of the engine 11 join. A catalyst 38 such as a three-way catalyst for cleaning CO, HC, and NOx in the exhaust gas is disposed downstream of the air-fuel ratio sensor 37.

The outputs of various sensors such as the air-fuel ratio sensor 37 are inputted to an engine control circuit (hereinafter denoted as "ECU") 40. The ECU 40 is mainly composed of a microcomputer and executes various engine control programs stored in a built-in ROM (storage medium) to control the fuel injection quantities and ignition timings of the fuel injection valves 20 of the respective cylinders according to the operating state of the engine 11.

In the first embodiment, the ECU 40 executes the respective routines shown in FIG. 2 and FIG. 4 and for controlling an air-fuel ratio of each cylinder to estimate the air-fuel ratio of each cylinder on the basis of the detection value of the air-fuel ratio sensor 37 (actual air-fuel ratio of exhaust gas flowing in the exhaust gas join portion 36) by the use of a cylinder air-fuel ratio estimation model to be described later while the engine is operated. The ECU 40 computes an average value of the estimated air-fuel ratios of all cylinders and sets the average value as a reference air-fuel ratio (target air-fuel ratio of all cylinders). The ECU 40 computes a deviation between the estimated air-fuel ratio of each cylinder (estimated cylinder air-fuel ratio) and the reference air-fuel ratio for each cylinder and computes a fuel correction factor for a fuel injection quantity of each cylinder (cylinder air-fuel ratio correction quantity AFCCI) so as to decrease the deviation. The ECU 40 learns the cylinder air-fuel ratio correction quantity AFCQ by smoothing processing or the like and corrects the fuel injection quantity of each cylinder on the basis of the cylinder air-fuel ratio correction quantity AFCQ and its learning value. In this manner, the ECU 40 corrects the air-fuel ratio of an air-fuel mixture, which is to be supplied to each cylinder, for each cylinder to control the air-fuel ratio of each cylinder so as to reduce variations in the air-fuel ratio between the cylinders (this control is hereinafter referred to as "cylinder air-fuel ratio control"). At this time, the ECU 40 learns the cylinder air-fuel ratio correction quantity AFCQ by the smoothing processing or the like, updates the learning value, and stores the learning value in a rewritable non-volatile memory (not shown) such as a backup RAM of the ECU 40. Under an operating condition in which the estimation of the cylinder air-fuel ratio is difficult (the computation of the cylinder air-fuel ratio correction quantity AFCQ is difficult), the ECU 40 may perform the cylinder air-fuel ratio control by the use of the learning value of the cylinder air-fuel ratio correction quantity AFCQ.

Here, a specific example of a model for estimating the air-fuel ratio of each cylinder (hereinafter referred to as "cylinder air-fuel ratio estimation model") on the basis of the detection value of the air-fuel ratio sensor 37 (actual air-fuel ratio of the exhaust gas flowing in the exhaust join portion 36) will be described.

With attention focused on gas exchange in the exhaust join portion 36, the detection value of the air-fuel ratio sensor 37 is formed into a model in which the product of the history of the estimated air-fuel ratio of each cylinder in the exhaust join portion 36 and a predetermined weighting coefficient is added to the product of the history of the detected value of the air-fuel sensor 37 and a predetermined weighting coefficient. Then, the air-fuel ratio of each cylinder is estimated by the use of this model. At this time, a Kalman filter is used as an observer.

More specifically, the model of gas exchange in the exhaust join portion 36 is approximated by the following equation (1), $$ys(t) = k1 \times u(t-1) + k2 \times u(t-2) - k3 \times ys(t-1) - k4 \times ys(t-2) \qquad (1)$$

where "ys" is the detection value of the air-fuel sensor 37, "u" is the air-fuel ratio of exhaust gas flowing into the exhaust join portion 36, and "k1" to "k4" are constants.

In the exhaust system, there exist a first-order lag element of the inflow and mixing of gas in the exhaust join portion 36 and a first-order lag element due to a delay in response of the air-fuel ratio sensor 37. Thus, in the above equation (1), the last two histories are referred to in consideration of these first-delay elements.

When the above equation (1) is converted into a state-space model, the following equations (2a), (2b) are derived, $$X(t+1) = A \times X(t) + B \times u(t) + W(t) \qquad (2a)$$

$$Y(t) = C \times X(t) + D \times u(t) \qquad (2b)$$

where A, B, C, and D are parameters of the model, Y is the detection value of the air-fuel ratio senor 37, X is the estimated air-fuel ratio of each cylinder, which is a state variable, and W is noise.

Further, when a Kalman filter is designed from the above equations (2a), (2b), the following equation (3) can be obtained, $$X^\hat{}(k+1|k) = A \times X^\hat{}(k|k-1) + K\{Y(k) - C \times A \times X^\hat{}(k|k-1)\} \qquad (3)$$

where $\hat{X}$ (X hat) is the estimated air-fuel ratio of each cylinder and K is a Kalman gain. $\hat{X}(k+1|k)$ means that the estimated value of the next time (k+1) is found from the estimated value of time (k).

In this manner, by constructing the cylinder air-fuel ratio estimation model by an observer of a Kalman filter type, the air-fuel ratio of each cylinder can be estimated in sequence as the combustion cycle proceeds.

There are cases in which when the fuel injection valve 20 or the like of any cylinder becomes abnormal and the control of the air-fuel ratio of the cylinder becomes difficult, variations in the air-fuel ratio between the cylinders becomes abnormally large and hence the cylinder air-fuel correction quantity and its learning value become abnormally large. Even if the cylinder air-fuel ratio control is continuously performed in this state, variations in the air-fuel ratio between the cylinders cannot be decreased, which results in excessively correcting the air-fuel ratios of the normal cylinders other than the abnormal cylinder. This contrarily raises the problem of impairing emission deteriorates and the like.

In this first embodiment, the following measures are taken against this problem. That is, when a state in which the cylinder air-fuel ratio correction quantity AFCQ (or its learning value) of any cylinder is outside a specified range continues for a while, the cylinder is determined to be an "abnormal cylinder" and fuel injection and ignition is cut for the abnormal cylinder to stop the combustion of the abnormal cylinder, whereas the cylinder air-fuel ratio control is continuously performed only for the normal cylinders other than the abnormal cylinder. At the same time, both or any one of the intake valve 25 and exhaust valve 26 of the cylinder for which combustion is stopped (abnormal cylinder) are or is closed to stop intake air from flowing into the exhaust manifold 35 through the cylinder for which combustion is stopped (abnormal cylinder). This can make it possible to detect the air-fuel ratio of combustion gas exhausted from the other cylinders for which combustion is performed by the air-fuel ratio sensor 37 with high accuracy without being affected by air from the cylinder for which combustion is stopped, the air being not yet combusted.

The cylinder air-fuel ratio control and the combustion stop control of the abnormal cylinder, which have been described above, are performed by the respective routines shown in FIG. 2 to FIG. 6 by the ECU 40. The processing contents of the respective routines will be described below.

[Main Routine for Cylinder Air-Fuel Ratio Control]

Figure 2:
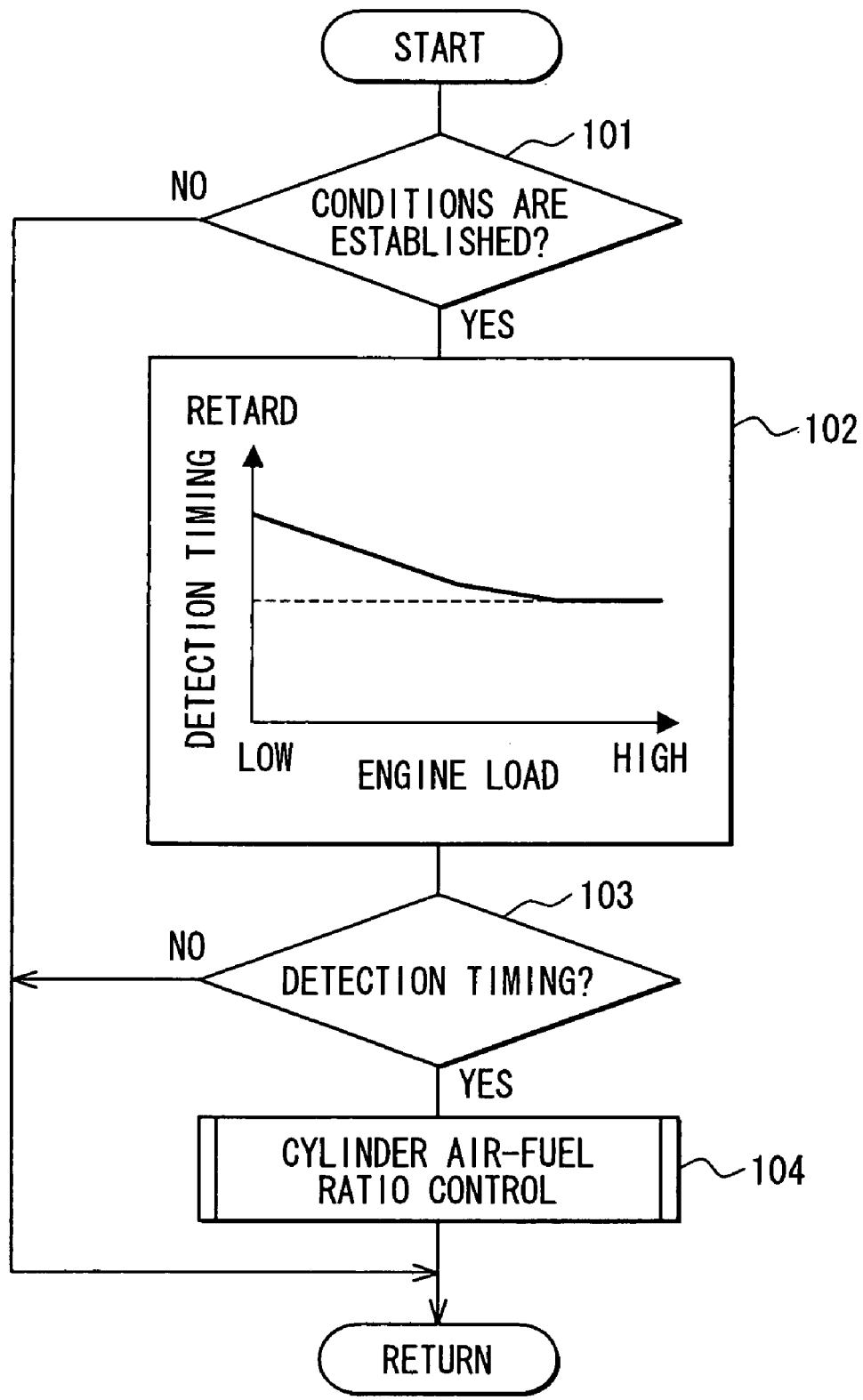
FIG. 2 is a flow chart showing a process of a main routine for cylinder air-fuel ratio control according to the first embodiment.

A main routine for cylinder air-fuel ratio control shown in FIG. 2 is started at intervals of a specified crank angle (for example 30° CA) in synchronization with the output pulse of the crank angle sensor 33. When this routine is started, first in step S101, it is determined whether conditions for performing the cylinder air-fuel ratio control hold. The conditions for performing the cylinder air-fuel ratio control include, for example, the following conditions (1) to (4).

(1) The air-fuel ratio sensor 37 is active.
(2) The air-fuel ratio sensor 37 is not determined to be abnormal (faulty).
(3) The engine 11 is warmed up (for example, cooling water temperature is a specified temperature or more).
(4) An engine operating range (for example, engine revolution speed and intake pipe pressure) is an operating range capable of securing the accuracy of estimation of an air-fuel ratio.

When all these four conditions (1) to (4) are satisfied, the conditions for performing the cylinder air-fuel ratio control hold. When any one of the conditions is not satisfied, the conditions for performing the cylinder air-fuel ratio control do not hold. When the conditions for performing the cylinder air-fuel ratio control do not hold, this routine is finished without performing the next and subsequent processings.

On the other hand, when the conditions for performing the cylinder air-fuel ratio control hold, the routine proceeds to step S102 where air-fuel ratio detection timing (sampling timing of the output of the air-fuel ratio sensor 37) of each cylinder is set by the use of a map according to an engine load (for example, intake pipe pressure) at that time. Here, the air-fuel ratio detection timing of each cylinder may be set by the use of a map according to the engine load and the engine revolution speed.

Then, the routine proceeds to step S103 where a present crank angle is the air-fuel ratio detection timing set in the step S102. If the present crank angle is not the air-fuel ratio detection timing set in the step S102, this routine is finished without performing the next and subsequent processings.

Figure 3:
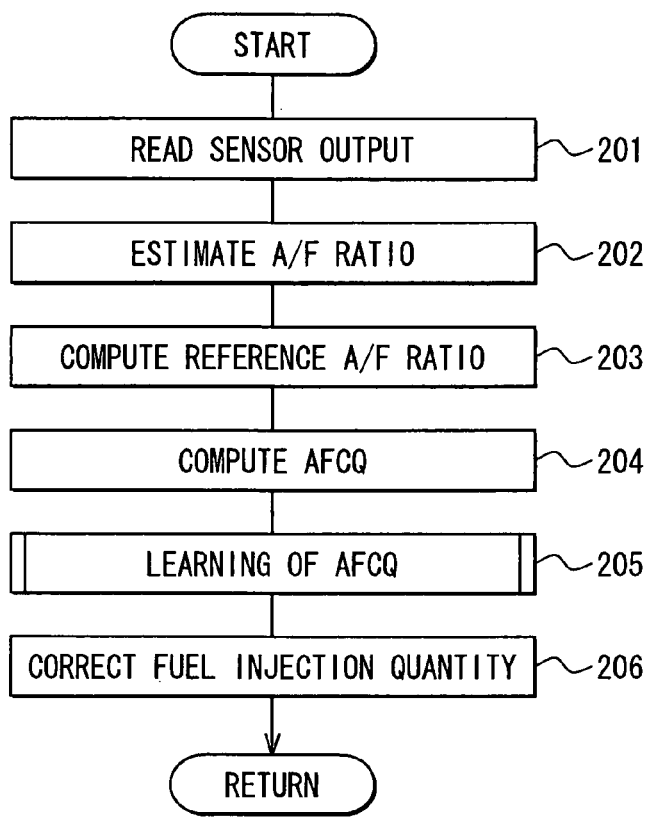
FIG. 3 is a flow chart showing a process for performing cylinder air-fuel ratio control according to the first embodiment.

On the contrary, if the present crank angle is the air-fuel ratio detection timing set in the step S102, the routine proceeds to step S104 where a routine for performing air-fuel ratio control shown in FIG. 3 is performed and this routine is finished.

[Routine for Performing Air-Fuel Ratio Control]

A routine for performing air-fuel ratio control shown in FIG. 3 is a subroutine performed in step S104 of the main routine for cylinder air-fuel ratio control shown in FIG. 2. When this routine is started, first in step S201, the output of the air-fuel ratio sensor 37 (detection value of air-fuel ratio) is read. Then, the routine proceeds to step S202 where the air-fuel ratio of a cylinder is estimated by the use of the air-fuel ratio estimation model on the basis of the detection value of the air-fuel ratio sensor 37. Then, the routine proceeds to step S203 where an average value of estimated air-fuel ratios of all cylinders is computed and where the average value is set as a reference air-fuel ratio (target air-fuel ratio of all cylinders).

Then, the routine proceeds step S204 where the deviation between the estimated air-fuel ratio of each cylinder and the reference air-fuel ratio is computed and where a cylinder air-fuel ratio correction quantity AFCQ (fuel correction quantity of each cylinder) is computed so as to reduce the deviation. Then, the routine proceeds to step S205 where a routine for learning cylinder air-fuel ratio correction quantity AFCQ shown in FIG. 4, which will be described later, is performed to learn the cylinder air-fuel ratio correction quantity AFCQ.

In the next step S206, the fuel injection quantity of each cylinder is corrected by the use of the cylinder air-fuel ratio correction quantity AFCQ of each cylinder and its learning value to correct the air-fuel ratio of an air-fuel mixture, which is to be supplied to each cylinder, for each cylinder, whereby the air-fuel ratio is controlled so as to reduce variations in the air-fuel ratio between the cylinders.

[Routine for Learning Cylinder Air-Fuel Ratio Correction Quantity]

Figure 4:
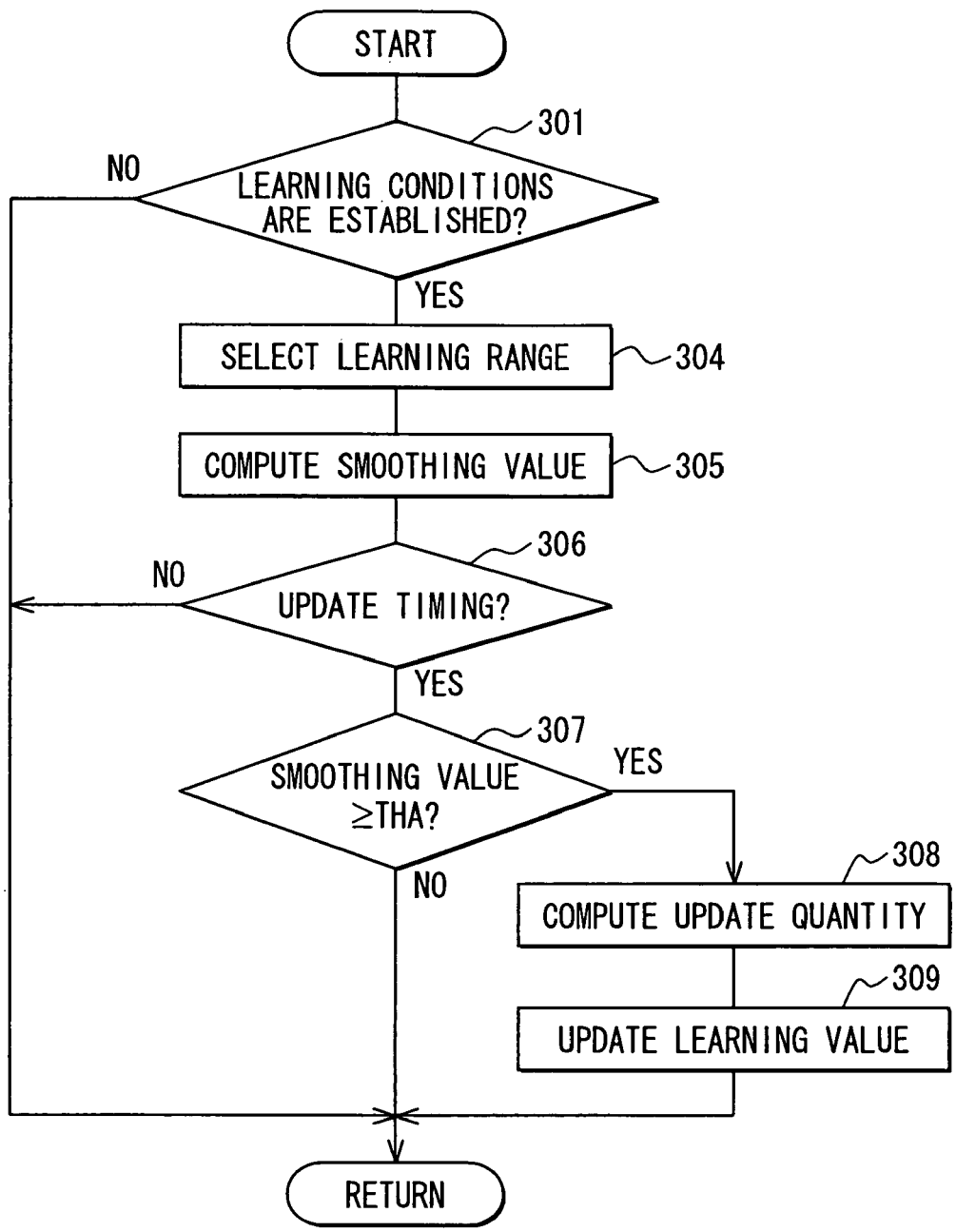
FIG. 4 is a flow chart showing a process for learning a cylinder air-fuel ratio correction quantity AFCQ according to the first embodiment.

A routine for learning cylinder air-fuel ratio correction quantity AFCQ, shown in FIG. 4, is a subroutine performed in step S205 of the routine for performing cylinder air-fuel ratio control, shown in FIG. 3. When this routine is started, first in step S301, it is determined whether conditions for performing learning hold. Here, the conditions for performing learning include, for example, the following two conditions (1) and (2).

(1) The cylinder air-fuel ratio control is being performed.
(2) The engine is operated in a stable operating state in which a change in air-fuel ratio is a specified value or less.

When both of the foregoing two conditions (1) and (2) are satisfied, the conditions for performing learning hold. When any one of the conditions is not satisfied, the conditions for performing learning do not hold. When these conditions for performing learning do not hold, this routine is finished without performing the next and subsequent processings.

Figure 7:
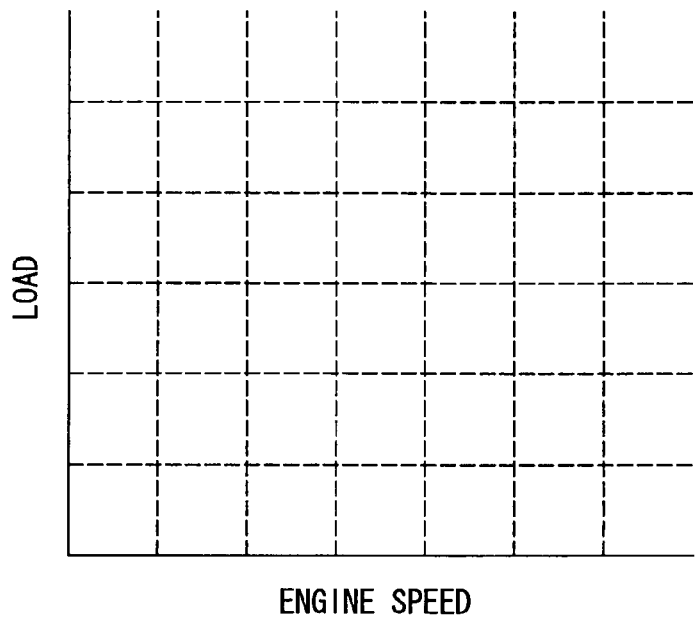
FIG. 7 is a diagram for conceptually showing a map for learning a cylinder air-fuel ratio correction quantity AFCQ according to the first embodiment.

On the other hand, when the conditions for performing learning hold, the routine proceeds to step S304 where a learning range (learning range in which a learning value of a cylinder air-fuel ratio correction quantity AFCQ is updated) corresponding to the present engine operating range (engine revolution speed and load) is selected in a map for learning a cylinder air-fuel ratio correction quantity AFCQ, the map being stored in the rewritable nonvolatile memory (not shown) of the ECU 40 and shown in FIG. 7. Then, the routine proceeds to step S305 where the smoothing value of the cylinder air-fuel ratio correction quantity AFCQ is computed for each cylinder by the following equation by the use of a smoothing coefficient K.

Smoothing Value of Correction quantity AFCQ={last smoothing value×(K−1)+correction quantity AFCQ of this time}/K Then, the routine proceeds to step S306 where it is determined whether this is the timing of updating the learning value of the cylinder air-fuel ratio correction quantity AFCQ. This timing of updating the learning value is set in such a way that a period of updating a learning value is longer than at least a period of computing a cylinder air-fuel ratio correction quantity AFCQ. If it is determined in this step S306 that this timing is not the timing of updating the learning value, this routine is finished without performing any processing.

On the other hand, if it is determined in step S306 that this is the timing of updating a learning value, the routine proceeds to step S307 where it is determined whether the absolute value of the smoothing value of the cylinder air-fuel ratio correction quantity AFCQ is a specified value THA or more. If the absolute value of the smoothing value of the cylinder air-fuel ratio correction quantity AFCQ is smaller than the specified value THA, it is determined that the learning value does not need to be updated and this routine is finished.

Moreover, if it is determined in step S307 that the absolute value of the smoothing value of the cylinder air-fuel ratio correction quantity AFCQ is the specified value THA or more, the routine proceeds to step S308 where the update quantity of a learning value is computed by a map on the basis of the smoothing value of the cylinder air-fuel ratio correction quantity AFCQ. The map used for computing the update quantity of a learning value is set in such a way that as the smoothing value of a cylinder air-fuel ratio correction quantity AFCQ becomes larger, the update quantity of a learning value becomes larger.

Then, the routine proceeds to step S309 where a value found by adding the update quantity of a learning value of this time to the last learning value of the cylinder air-fuel ratio correction quantity AFCQ is updated and stored as a new learning value of the cylinder air-fuel ratio correction quantity AFCQ in the rewritable non-volatile memory (not shown) of the ECU 40. At this time, the learning value in a learning range selected in the step S304 of the map for learning the cylinder air-fuel ratio correction quantity AFCQ, which is shown in FIG. 7, is updated. The map for learning the cylinder air-fuel ratio correction quantity AFCQ, which is shown in FIG. 7, is made for each cylinder.

[Routine for Determining an Abnormal Cylinder]

Figure 5:
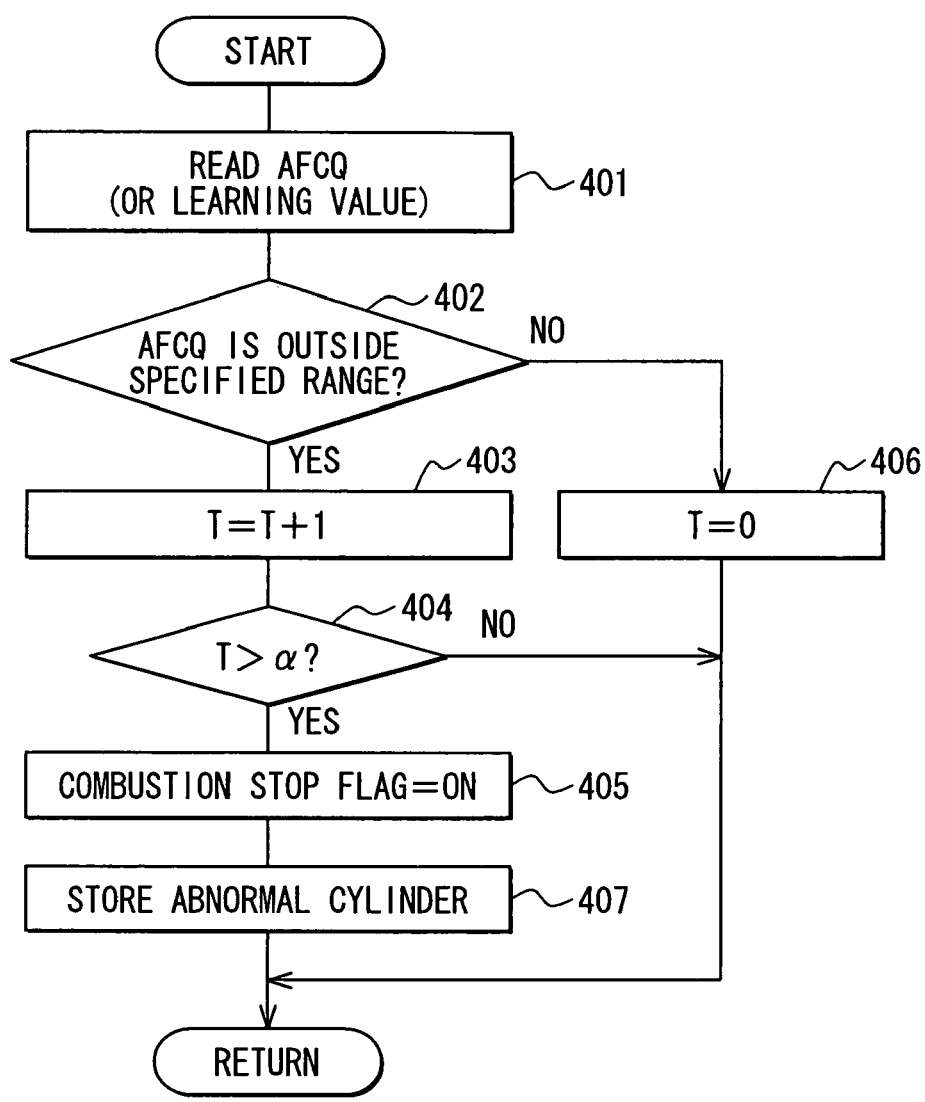
FIG. 5 is a flow chart showing a process for determining an abnormal cylinder according to the first embodiment.

A routine for determining an abnormal cylinder shown in FIG. 5 is a subroutine performed at specified intervals while the engine is operated and acts as abnormal cylinder determination means. When this routine is started, first in step S401, the cylinder air-fuel ratio correction quantity AFCQ (or its learning value) of each cylinder is read. Then, in the next step S402, it is determined whether the cylinder air-fuel ratio correction quantity AFCQ (or its learning value) of any cylinder is outside a specified range. As a result, if the cylinder air-fuel ratio correction quantities (or their learning values) of all cylinders are within the specified range, it is determined that the cylinder air-fuel ratio control is performed for all cylinders. Then, the routine proceeds to step S406 where the value of a delay time counter T for counting a period of time during which a state in which the cylinder air-fuel ratio correction quantity AFCQ is outside the specified range continues is reset to "0" and then this routine is finished.

In contrast to this, if it is determined in the step S402 that the cylinder air-fuel ratio correction quantity AFCQ (or its learning value) of any cylinder is outside the specified range, the routine proceeds to step S403 where the delay time counter T counts up the period of time during which a state in which the cylinder air-fuel ratio correction quantity AFCQ is outside the specified range continues. Then, the routine proceeds to step S404 where it is determined whether the count value of the delay time counter T is larger than a specified value. If the count value of the delay time counter T is not larger than the specified value, this routine is finished without performing any processing.

Thereafter, when the count value of the delay time counter T becomes larger than the specified value, the routine proceeds to step S405 where a combustion stop flag is set ON (combustion is stopped). Then, in the next step S407, the cylinder is stored as an "abnormal cylinder" in the memory of the ECU 40. Then, this routine is finished.

[Routine for Controlling Abnormal Cylinder Combustion Stop]

Figure 6:
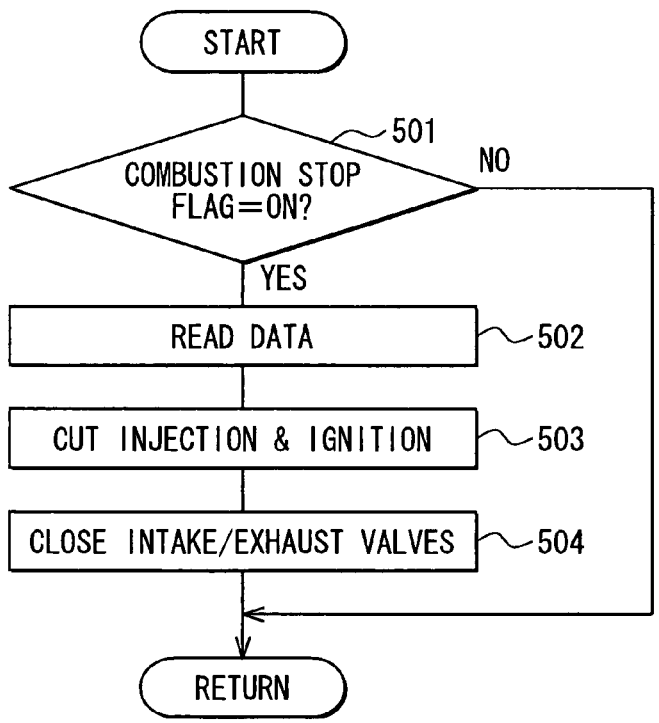
FIG. 6 is a flow chart showing a processing for controlling abnormal cylinder combustion stop according to the first embodiment.

A routine for controlling abnormal cylinder combustion stop, shown in FIG. 6, is performed at specified intervals while the engine is operated. When this routine is started, first in step S501, it is determined whether the combustion stop flag is set ON (combustion is stopped). If the combustion stop flag is not set ON (combustion is not stopped), this routine is finished without performing the next and subsequent processings. In this case, fuel injection and ignition are performed for all cylinders.

[A0047]

In contrast to this, if the combustion stop flag is set ON (combustion is stopped), the routine proceeds to step S502 where the data of the abnormal cylinder stored in the memory of the ECU 40 is read. Then, the routine proceeds to step S503 where the fuel injection and ignition are cut for the abnormal cylinder to stop the combustion of the abnormal cylinder. Then, in the next step S504, both or any one of the intake valve 25 and the exhaust valve 26 of the combustion stop cylinder (abnormal cylinder) are or is closed to stop intake air from flowing into the exhaust manifold 35 through the combustion stop cylinder (abnormal cylinder), whereas the cylinder air-fuel ratio control is continuously performed only for the normal cylinders other than the combustion stop cylinder (abnormal cylinder).

Control examples of this first embodiment described above will be described by the use of a time chart shown in FIG. 8 and FIG. 9.

Figure 8:
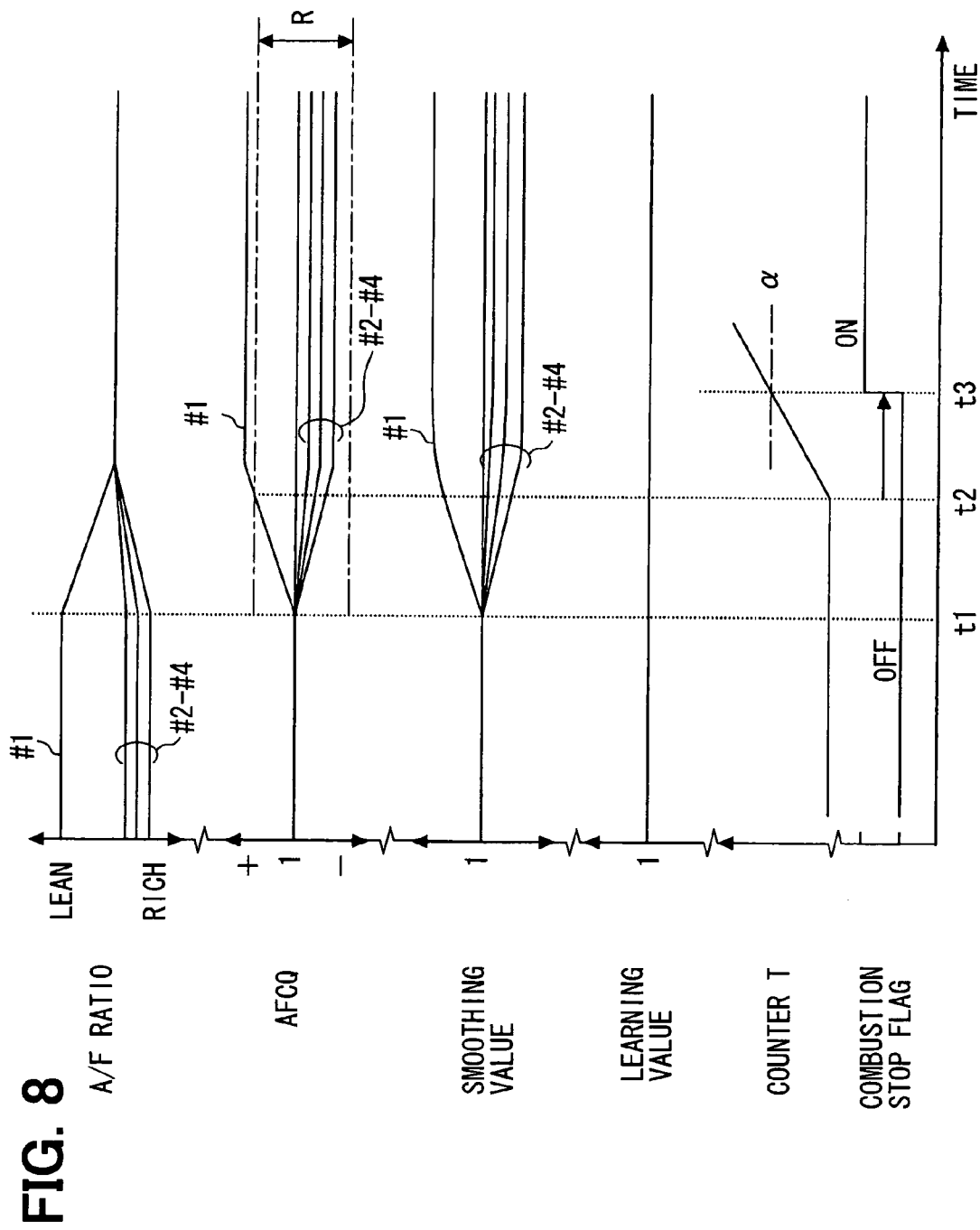
FIG. 8 is a time chart showing a control example according to the first embodiment.

FIG. 8 shows an example in which the cylinder air-fuel ratio correction quantity AFCQ is compared with the specified range R (normal range) to turn ON/OFF the combustion stop flag. In this example, at time t1, the conditions for performing cylinder air-fuel ratio control are satisfied and the cylinder air-fuel ratio control is started and the cylinder air-fuel ratio correction quantities AFCQ of the respective cylinders #1 to #4 are computed. While the cylinder air-fuel ratio control is performed, it is determined whether the cylinder air-fuel ratio correction quantities AFCQ of the cylinders #1 to #4 are outside the specified range R (outside the normal range). At time t2 when the cylinder air-fuel ratio correction quantity AFCQ of the cylinder of any cylinder (cylinder #1 in the example shown in FIG. 8), the delay time counter T starts a counting-up operation to count a period of time during which a state in which the cylinder air-fuel ratio correction quantity AFCQ is outside the specified range continues.

Then, at time t3 when the count value of the delay time counter T becomes larger than the specified value α, the cylinder is determined to be an "abnormal cylinder" and the combustion stop flag is set ON (combustion is stopped). Thereafter, the fuel injection and ignition are cut for the abnormal cylinder and both or any one of the intake valve 25 and the exhaust valve 26 of the combustion stop cylinder (abnormal cylinder) is closed to prevent intake air from flowing into the exhaust manifold 35 through the combustion stop cylinder (abnormal cylinder), whereas the cylinder air-fuel ratio control is continuously performed only for the normal cylinders other than the combustion stop cylinder (abnormal cylinder).

Figure 9:
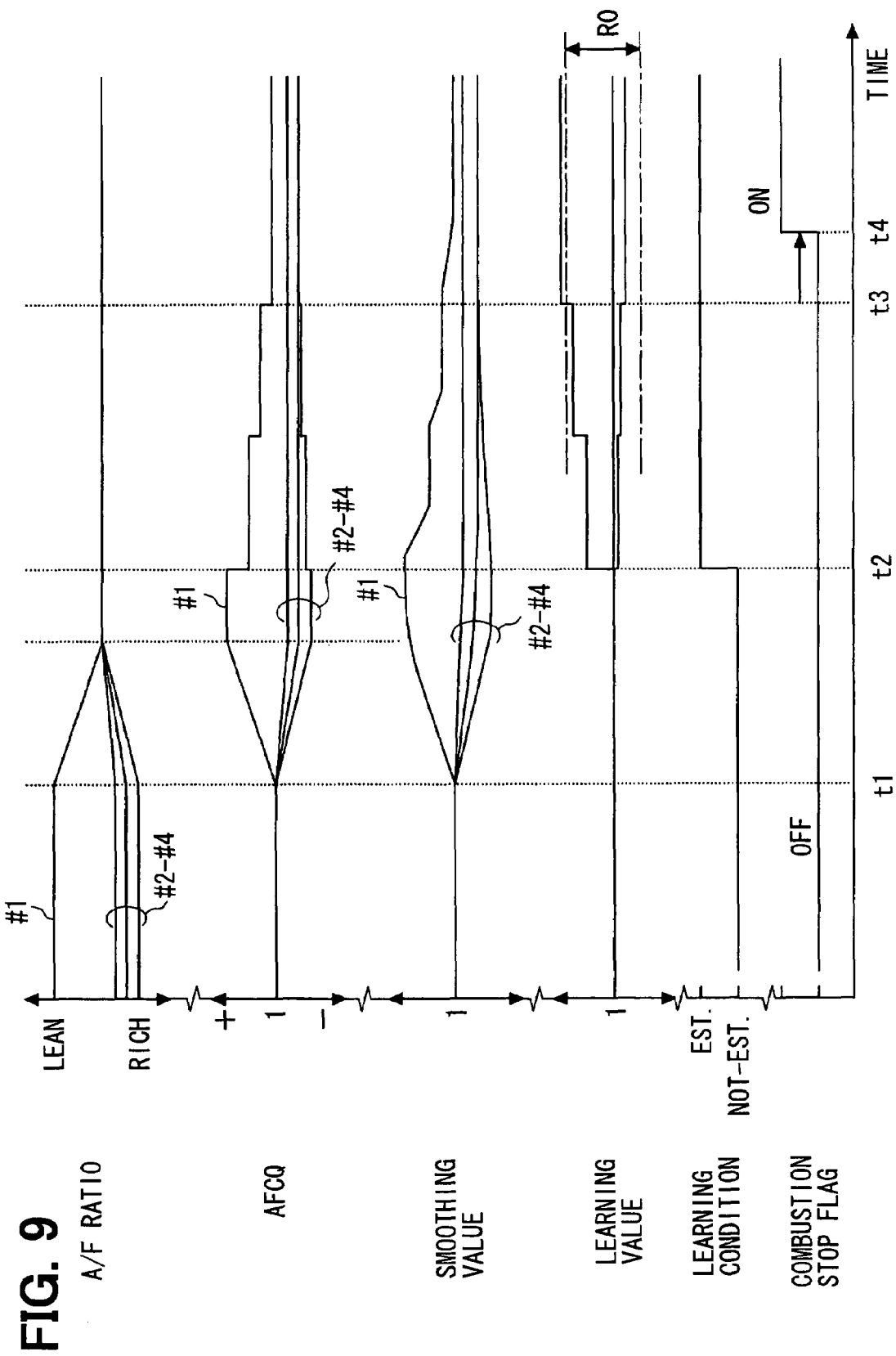
FIG. 9 is a time chart showing a control example according to the first embodiment.

On the other hand, FIG. 9 shows an example in which the learning value of the cylinder air-fuel ratio correction quantity AFCQ is compared with a specified range (normal range) to turn ON/OFF the combustion stop flag. In this example, at time t1, the conditions for performing cylinder air-fuel ratio control are satisfied and the cylinder air-fuel ratio control is started and the cylinder air-fuel ratio correction quantities of the respective cylinders #1 to #4 are computed.

Then, at time t2, conditions for performing learning are satisfied and the learning of a cylinder air-fuel ratio correction quantity AFCQ is started and the learning values of the cylinder air-fuel ratio correction quantities of the respective cylinders #1 to #4 are updated.

Then, it is determined whether the learning values of the cylinder air-fuel ratio correction quantities of the respective cylinders #1 to #4 are outside the specified range (outside the normal range). At time t3 when the learning value of the cylinder air-fuel ratio correction quantity AFCQ of any cylinder is outside the specified range, the delay time counter T starts the counting-up operation to count a period of time during which a state in which the cylinder air-fuel ratio correction quantity AFCQ is outside the specified range continues.

Then, at time t4 when the count value of the delay time counter T becomes larger than the specified value, the cylinder is determined to be an "abnormal cylinder" and the combustion stop flag is set ON (combustion is stopped). Thereafter, the fuel injection and ignition are cut for the abnormal cylinder to stop the combustion of the abnormal cylinder and both or any one of the intake valve 25 and the exhaust valve 26 of the abnormal cylinder are or is closed to prevent intake air from flowing into the exhaust manifold 35 through the combustion stop cylinder (abnormal cylinder), whereas the cylinder air-fuel ratio control is continuously performed only for the normal cylinders other than the combustion stop cylinder (abnormal cylinder).

According to this first embodiment described above, when a state in which the cylinder air-fuel ratio correction quantity AFCQ (or its learning value) of any cylinder is outside the specified range continues, the cylinder is determined to be the "abnormal cylinder" and the combustion of the abnormal cylinder is stopped, whereas the cylinder air-fuel ratio control is continuously performed only for the normal cylinders other than the abnormal cylinder. With this, the air-fuel ratios of the other normal cylinders can be prevented from being excessively corrected by the effect of the abnormal cylinder for which the air-fuel ratio control is difficult and the cylinder air-fuel ratio control can be continuously performed only for the normal cylinders. Thus, it is possible to prevent the deterioration of exhaust emission.

In addition, in this first embodiment, both or any one of the intake valve 25 and the exhaust valve 26 of the abnormal cylinder are or is closed to prevent intake air from flowing into the exhaust manifold 35 through the combustion stop cylinder (abnormal cylinder). Thus, the air-fuel ratio of combustion gas exhausted from the cylinders other than the combustion stop cylinder (abnormal cylinder) can be detected by the air-fuel ratio sensor 37 with high accuracy without being affected by air from the combustion stop cylinder (abnormal cylinder), the air being not yet used for combustion. Therefore, it is possible to prevent the estimation accuracy of air-fuel ratio of the combustion cylinder from being reduced by the air from the combustion stop cylinder (abnormal cylinder), the air being not yet used for combustion.

Second Embodiment

[A0056]

In the routine for learning a cylinder air-fuel ratio correction quantity AFCQ shown in FIG. 4, which has been described in the first embodiment, the learning value! of the cylinder air-fuel ratio correction quantity AFCQ is updated for each engine operating range (engine revolution speed and load) (see FIG. 7).

[A0057]

Figure 10:
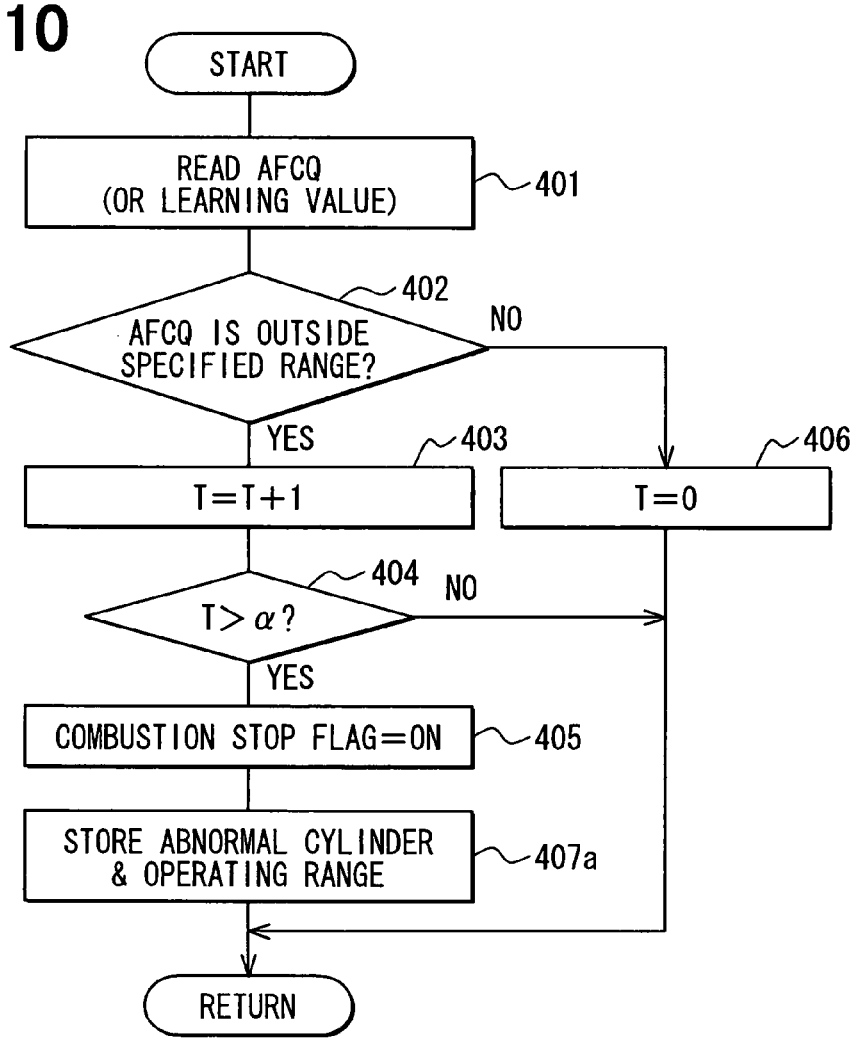
FIG. 10 is a flow chart showing a process for determining an abnormal cylinder according to a second embodiment.
Figure 11:
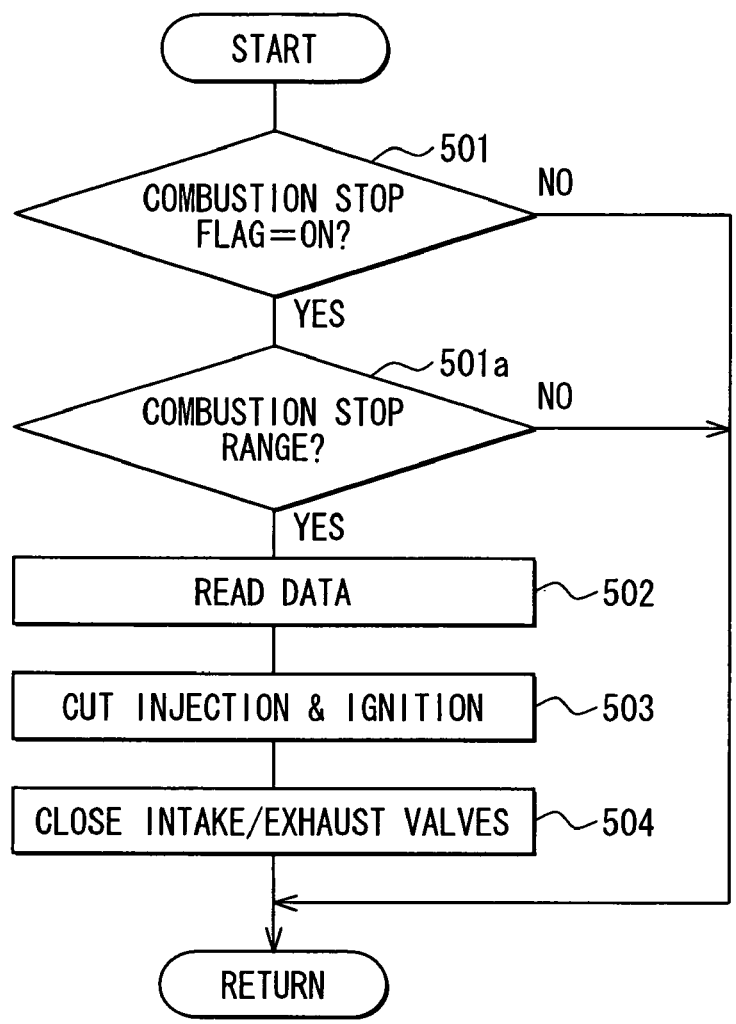
FIG. 11 is a flow chart showing a process for controlling abnormal cylinder combustion stop according to the second embodiment.

In consideration of this point, in an second embodiment of the present invention shown in FIG. 10 and FIG. 11, if the cylinder air-fuel ratio correction quantity AFCQ (or its learning value) of any cylinder is outside the specified range and hence the abnormal cylinder is found, the combustion of the abnormal cylinder is stopped only in an operating range in which the cylinder air-fuel ratio correction quantity AFCQ (or its learning value) is outside the specified range and in the other operating range, the fuel injection and ignition are continuously performed even for the cylinder determined to be abnormal cylinder to combust the fuel in the cylinder.

Hereinafter, processing contents of a routine performed in this second embodiment and shown in FIG. 10 and FIG. 11 will be described below.

A routine for determining an abnormal cylinder shown in FIG. 10 is different from the routine for determining an abnormal cylinder, which has been described in the first embodiment and is shown in FIG. 5, only in that processing in step S407 of the routine described in the first embodiment and shown in FIG. 5 is changed to processing in step S407a, and is the same in the processings of the other steps as the routine shown in FIG. 5.

In the routine for determining an abnormal cylinder shown in FIG. 10, by the processing in steps 401 to 405, the combustion stop flag is set ON (combustion is stopped) when a state in which the cylinder air-fuel ratio correction quantity AFCQ (or its learning value) is outside the specified range continues for the specified time. Then, the routine proceeds to step S407a where a cylinder of which AFCQ (or its learning value) is outside the specified range is stored as an "abnormal cylinder" in the memory of the ECU 40 and the present operating range is stored as a combustion stop operating range in the memory. Then, this routine is finished.

A routine for controlling an abnormal cylinder combustion stop shown in FIG. 11 is different from the routine for controlling an abnormal cylinder combustion stop, which has been described in the first embodiment and is shown in FIG. 6, only in that determination processing in step S501a is appended to processing in step S501 of the routine shown in FIG. 6, and is the same in the processing of the other steps as the routine shown in FIG. 6.

When this routine is started, first in step S501, it is determined whether the combustion stop flag is set ON (combustion is stopped). If the combustion stop flag is not set ON (combustion is not stopped), this routine is finished without performing the next and subsequent processings. In this case, the fuel injection and ignition are performed for all cylinders.

In contrast to this, if the combustion stop flag is set ON (combustion is stopped), the routine proceeds to step S501a where it is determined whether a present engine operating range is the combustion stop operating range stored in the memory. If the present engine operating range is not the combustion stop operating range, this routine is finished without performing the next and subsequent processings. Also in this case, the fuel injection and ignition are performed for all cylinders.

On the other hand, if it is determined in step S501a that the present engine operating range is the combustion stop operating range, processings in steps 502 to 504 are performed to cut the fuel injection and ignition of the abnormal cylinder stored in the memory to stop the combustion of the abnormal cylinder. At the same time, both or any one of the intake valve 25 and the exhaust valve 26 of the combustion stop cylinder (abnormal cylinder) are or is closed to prevent intake air from flowing into the exhaust manifold 35 through the combustion stop cylinder (abnormal cylinder), whereas the cylinder air-fuel ratio control is continuously performed only for the normal cylinder other than the combustion stop cylinder (abnormal cylinder).

In this second embodiment described above, only in the operating range in which the cylinder air-fuel ratio correction quantity AFCQ (or its learning value) of any cylinder is outside the specified range, the combustion of the abnormal cylinder is stopped. Thus, the cylinder air-fuel ratio control can be performed even for the abnormal cylinder in the other operating range.

Third Embodiment

Depending on the position of the abnormal cylinder for which combustion is stopped, there is a possibility that engine rotational torque will be unbalanced to cause engine vibration to make a driver feel uncomfortable. This third embodiment of the present invention takes the following countermeasures. That is, when the combustion of the abnormal cylinder is stopped, if the abnormal cylinder is located at a position where engine vibration is caused, a cylinder to be balanced with the abnormal cylinder is also stopped from combusting. For example, when an abnormal cylinder is a cylinder #1 in a four-cylinder engine, a cylinder #3 balanced with the cylinder #1 is also stopped from combusting.

In this manner, the engine vibration, which is caused by stopping the combustion of the abnormal cylinder, can be attenuated by stopping the combustion of the cylinder balanced in torque with the abnormal cylinder. Thus, this can help to avoid an uncomfortable vibration.

Fourth Embodiment

In an engine having a plurality of groups of cylinders, the cylinder air-fuel ratio control can be independently performed for each group of cylinders.

In view of this point, in a fourth embodiment of the present invention, when the combustion of the abnormal cylinder is stopped, combustion is stopped for all of the cylinders of the group of cylinders to which the abnormal cylinder belongs. In this case, the group of cylinders may be any one of a bank group, an intake control group, and an exhaust control group. In this fourth embodiment, when the abnormal cylinder for which the air-fuel ratio control is difficult is developed, the cylinder air-fuel ratio control can be continuously performed only for the group of normal cylinders.

Fifth Embodiment

In the foregoing cylinder air-fuel ratio control system, there is a case where when the air-fuel ratio control becomes difficult for any cylinder because of the failure of the fuel injection valve 20 or the like, the air-fuel ratio of the abnormal cylinder for which the air-fuel ratio control is difficult is greatly varied in a lean direction. As a result, there is a case where the air-fuel ratio of the exhaust gas (in other words, exhaust gas of a mixture of exhaust gas from the abnormal cylinder and exhaust gas from the normal cylinders) flowing into the catalyst 38 is shifted in the lean direction. If the air-fuel ratio of the exhaust gas flowing into the catalyst 38 is shifted in the lean direction, there is a possibility that the quantity of lean component (oxygen quantity) flowing into the catalyst 38 will be increased to accelerate the oxidation reaction of rich components such as HC and CO to overheat the catalyst 38 by the reaction heat to impair the catalyst 38.

Thus, in this fifth embodiment, the ECU 40 determines the presence or absence of a lean abnormal cylinder in which the air-fuel ratio is greatly varied in the lean direction on the basis of the air-fuel ratio of the cylinder. If the ECU 40 determines that a lean abnormal cylinder is developed, the ECU 40 performs a limited operation control for limiting an engine output to limit the quantity of the exhaust gas (oxygen) flowing into the catalyst 38 to prevent the reaction heat from being produced to such an extent that the catalyst 38 is overheated.

Figure 12:
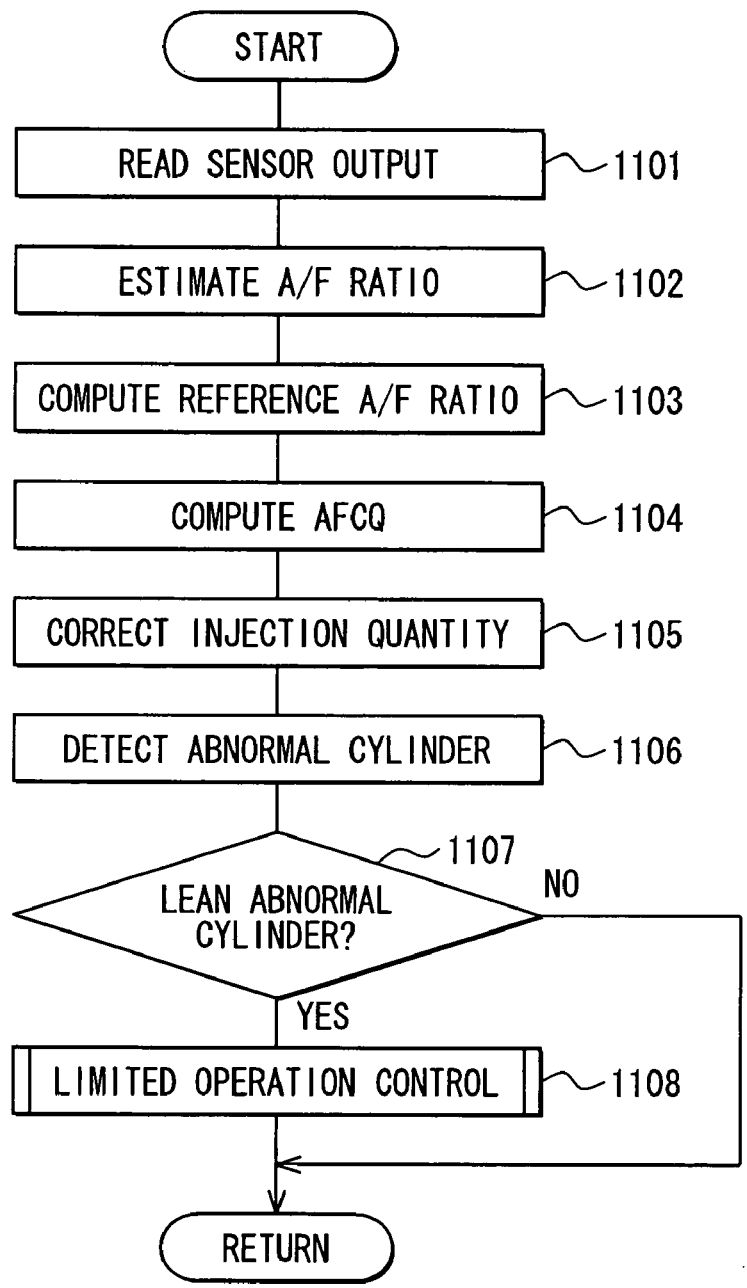
FIG. 12 is a flow chart showing a process for cylinder air-fuel ratio control according to a fifth embodiment.
Figure 13:
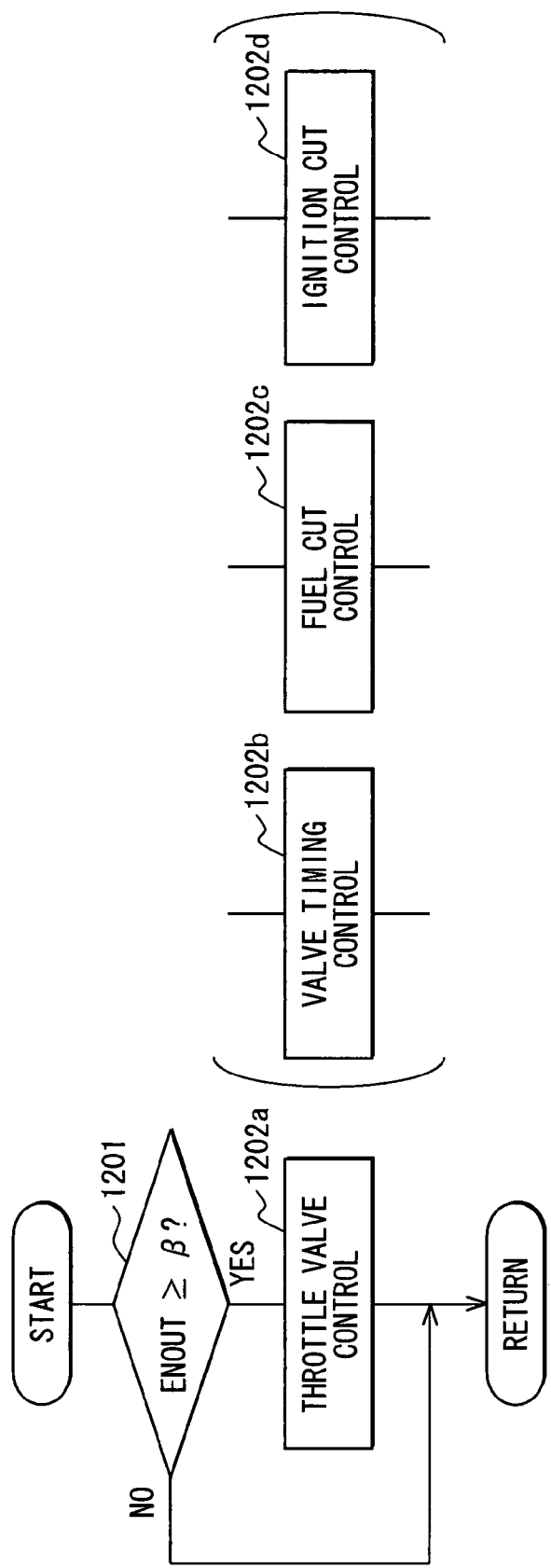
FIG. 13 is a flow chart showing a process for limited operation control according to the fifth embodiment.

The cylinder air-fuel ratio control and the limited operation control are performed by the respective routines shown in FIGS. 12 and 13. The processing contents of the respective routines will be described below.

[Routine for Controlling a Cylinder Air-Fuel Ratio]

A routine for controlling a cylinder air-fuel ratio shown in FIG. 12 is started at intervals of a specified crank angle (for example, 30° CA) in synchronization with the output pulse of the crank angle sensor 33. When this routine is started, first in step S1101, the output of the air-fuel ratio sensor 37 (detection value of air-fuel ratio) is read. Then, the routine proceeds to step S1102 where the air-fuel ratio of a cylinder, which is to be estimated this time, is estimated on the basis of the detection value of the air-fuel ratio sensor 37 by the use of the foregoing cylinder air-fuel ratio estimation model.

Then, the routine proceeds to step S1103 where an average value of the estimated air-fuel ratios of all cylinders and where the average value is set as a reference air-fuel ratio (target air-fuel ratio of all cylinders). Then, the routine proceeds to step S1104 where the deviation between the estimated air-fuel ratio of each cylinder and the reference air-fuel ratio is computed and where a cylinder air-fuel ratio correction quantity AFCQ (fuel correction quantity of each cylinder) is computed so as to reduce the deviation.

Then, the routine proceeds to step S1105 where the fuel injection quantity of each cylinder is corrected on the basis of the cylinder air-fuel ratio correction quantity AFCQ of each cylinder. That is, the cylinder air-fuel ratio control for correcting a fuel injection quantity of each cylinder on the basis of the cylinder air-fuel ratio correction quantity AFCQ to reduce a variation in the air-fuel ratio between the cylinders is performed.

Then, the routine proceeds to step S1106 where it is determined whether the deviation between the estimated air-fuel ratio of each cylinder and the reference air-fuel ratio is larger than a lean-side abnormality determination value and where a cylinder in which the deviation between the estimated air-fuel ratio of each cylinder and the reference air-fuel ratio is larger than the lean-side abnormality determination value (in other words, an air-fuel ratio is greatly varied in a lean direction) is detected as a lean abnormal cylinder. Then, the routine proceeds to step S1107 where it is determined whether a lean abnormal cylinder is developed on the basis of the detection result of the step S1106.

If it is determined in this step S1107 that a lean abnormal cylinder is not developed, this routine is finished without performing any more processing.

On the other hand, if it is determined in this step S1107 that a lean abnormal cylinder is developed, the routine proceeds to step S1108 where a routine for limited operation control, which is shown in FIG. 13 and will be described later, is performed. Then, limited operation control for limiting an engine output is performed to limit an exhaust gas quantity (oxygen quantity) flowing into the catalyst 38 to prevent reaction heat from being produced to such an extent that the catalyst 38 is overheated.

[Routine for Limited Operation Control]

The routine for limited operation control shown in FIG. 13 is a subroutine performed in step S1108 of the routine for cylinder air-fuel ratio control shown in FIG. 12. When this routine is started, first in step S1201, it is determined whether the engine output ENOUT is a specified value β or more. In this case, it may be determined whether the engine output estimated on the basis of one or two or more pieces of information related to the engine output (for example, intake air quantity, intake pipe pressure, cylinder pressure, charging rate of air, engine shaft torque) is a specified value or more. Alternatively, whether the engine output is a specified value or more may be determined by whether one or two or more pieces of information related to the engine output is a specified value or more.

If it is determined in this step S1201 that the engine output is smaller than the specified value, this routine is finished without limiting the engine output.

On the other hand, if it is determined in this step S1201 that the engine output is the specified value or more, the routine proceeds to step S1202a where the throttle valve is controlled in a direction to close the opening of the throttle valve (in a direction to decrease an intake air quantity) to reduce the engine output to limit the engine output to a specified value or less. This can limit the exhaust gas quantity (oxygen quantity) flowing into the catalyst 38 to prevent reaction heat from being produced to such an extent that the catalyst 38 is overheated.

In place of the processing in step S1202a, processing in step S1202b may be performed to change the valve timings (opening/closing timings) of the intake valve 25 and the exhaust valve 26 in a direction to reduce the engine output by the variable valve timing mechanisms 27, 28 to reduce the engine output, thereby limiting the engine output to a specified value or less.

Moreover, in the case of a system provided with a variable valve lift mechanism, the lift of the intake valve 25 or the exhaust valve 26 may be changed in a direction to reduce the engine output, thereby limiting the engine output to the specified value or less.

Further, in place of the processing in the step S1202a, processing in step1202c may be performed to perform fuel cut control to reduce the engine output, thereby limiting the engine output to the specified value or less.

Still further, in place of the processing in the step S1202a, processing in step1202d may be performed to perform ignition cut control to reduce the engine output, thereby limiting the engine output to the specified value or less.

Still further, two or more processings of the processings in the steps 1202a to 1202d may be performed in combination.

In the foregoing fifth embodiment, the limited operation control for limiting an engine output is performed when it is determined that a lean abnormal cylinder is developed. Thus, even if the air-fuel ratio of the exhaust gas flowing into the catalyst 38 is shifted in the lean direction (in a direction in which the oxygen quantity flowing into the catalyst 38 is increased to accelerate oxidation reaction), by limiting the engine output, it is possible to limit the exhaust gas quantity (oxygen quantity) flowing into the catalyst 38 to prevent reaction heat from being produced to such an extent that the catalyst 38 is overheated. Therefore, it is possible to prevent the catalyst 38 from being overheated by the development of the abnormal cylinder.

Sixth Embodiment

A sixth embodiment of the present invention will be described with reference to FIG. 14.

In the fifth embodiment, the limited operation control for limiting an engine output is performed when it is determined that a lean abnormal cylinder is developed. However, in this sixth embodiment, when it is determined that a lean abnormal cylinder is developed, a routine for limited operation control shown in FIG. 14 is performed to perform limited operation control for limiting an engine revolution speed.

Figure 14:
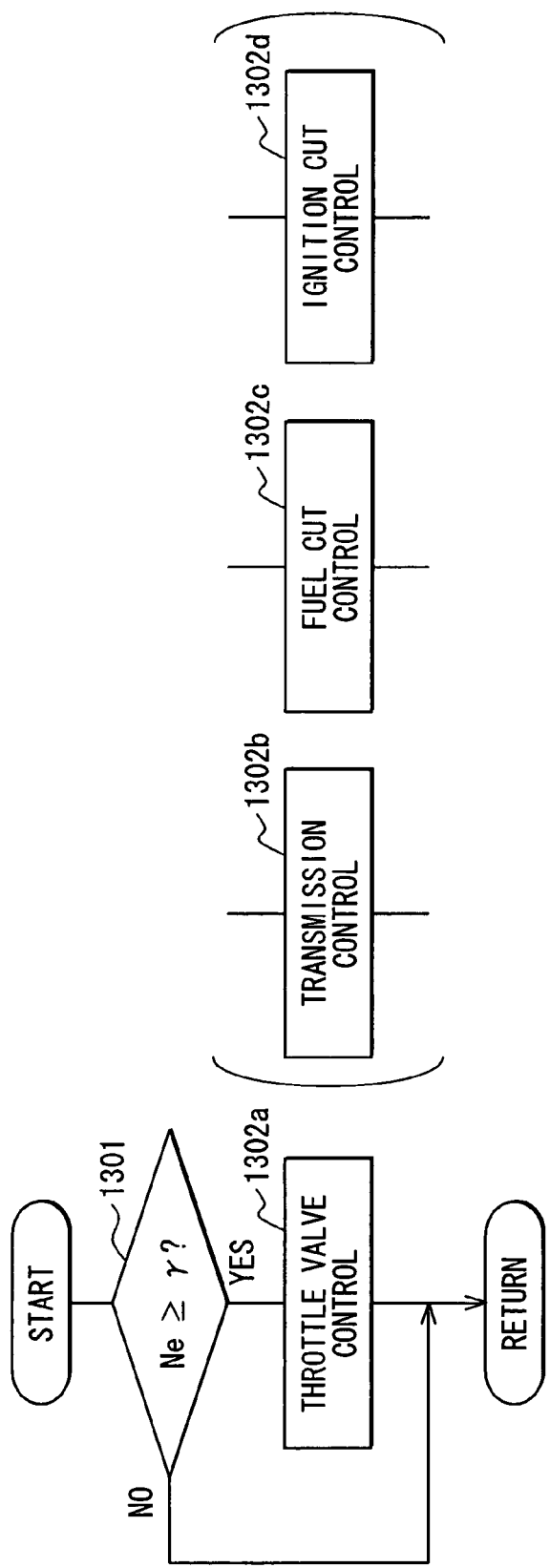
FIG. 14 is a flow chart showing a process for limited operation control according to a sixth embodiment.

In the routine for limited operation control shown in FIG. 14, first in step S1301, it is determined whether an engine revolution speed Ne is a specified value γ or more. Whether an engine revolution speed is a specified value or more may be determined by whether information related to an engine revolution speed (for example, vehicle speed) is a specified value or more.

If it is determined in this step S1301 that an engine revolution speed is smaller than a specified value, this routine is finished without limiting the engine revolution speed.

On the other hand, if it is determined in the step S1301 that an engine revolution speed is a specified value or more, the routine proceeds step S1302a where the throttle valve is controlled in a direction to close the throttle opening (in a direction to reduce an intake air quantity) to decrease the engine revolution speed, thereby limiting the engine revolution speed to a specified value or less. This can limit the exhaust gas quantity (oxygen quantity) flowing into the catalyst 38 to prevent the reaction heat from being produced to such an extent that the catalyst 38 is overheated.

In place of processing in step S1302a, processing in step S1302b may be performed to shift up the gear of the transmission to change a transmission ratio in a direction to reduce the engine revolution speed to reduce the engine revolution speed, thereby limiting the engine revolution speed to the specified value or less.

Moreover, in place of processing in step S1302a, processing in step S1302c may be performed to perform the fuel cut control to reduce the engine revolution speed, thereby limiting the engine revolution speed to the specified value or less.

Moreover, in place of processing in step S1302a, processing in step S1302d may be performed to perform the ignition cut control to reduce the engine revolution speed, thereby limiting the engine revolution speed to the specified value or less.

Furthermore, two or more processings of the processings in steps 1302a to 1302d may be performed in combination.

Also in the foregoing sixth embodiment, the same effect as in the foregoing fifth embodiment can be produced.

Seventh Embodiment

Next, a seventh embodiment of the present invention will be described with reference to FIG. 15 to FIG. 18.

Figure 15:
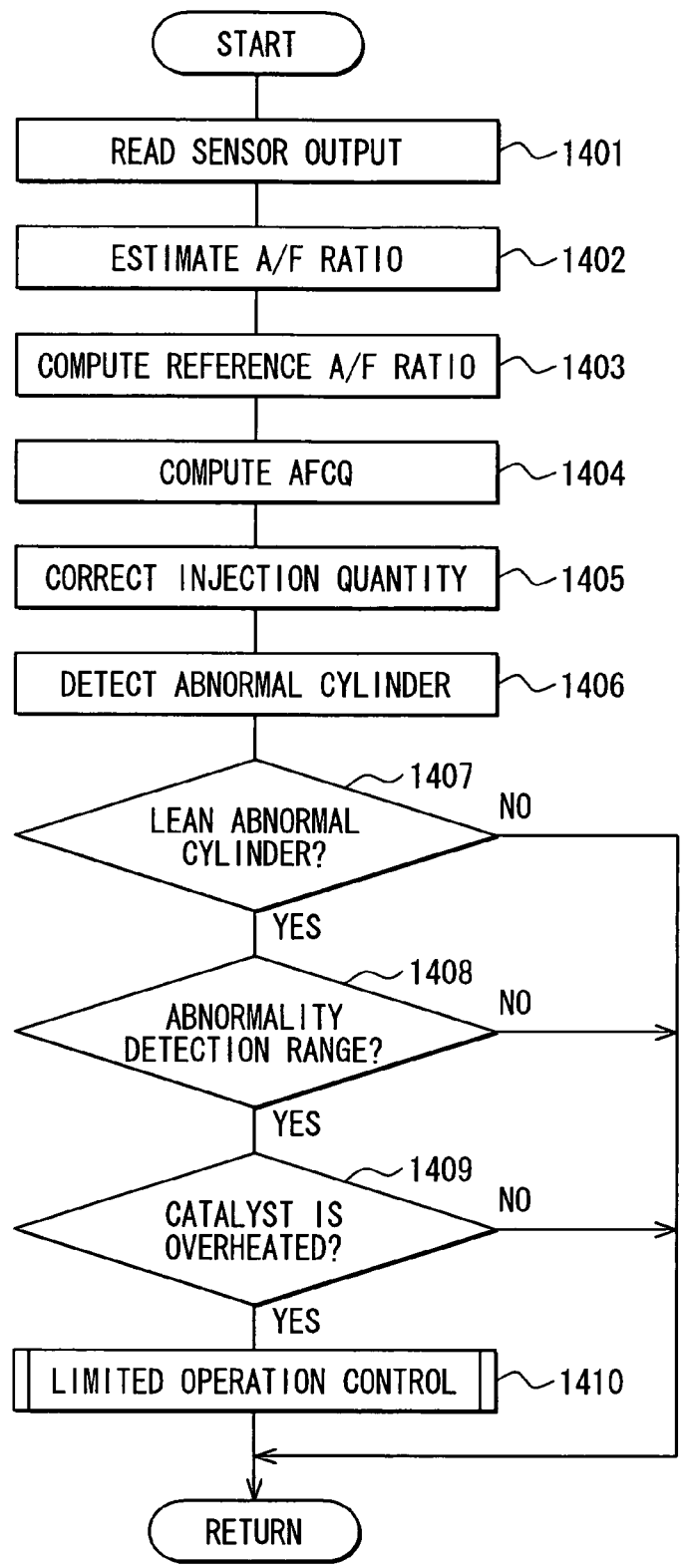
FIG. 15 is a flow chart showing a process for cylinder air-fuel ratio control according to a seventh embodiment.

In this seventh embodiment, a routine for cylinder air-fuel ratio control shown in FIG. 15 is performed to determine whether a lean abnormal cylinder is developed in each engine operating range. The limited operation control is performed in the operating range in which it is determined that a lean abnormal cylinder is developed.

In the routine for cylinder air-fuel ratio control shown in FIG. 15, the estimated air-fuel ratio of each cylinder and the reference air-fuel ratio are computed on the basis of detection value of the air-fuel ratio sensor 37, and the deviation between the estimated air-fuel ratio of each cylinder and the reference air-fuel ratio is computed, and the cylinder air-fuel ratio correction quantity AFCQ (fuel correction quantity of each cylinder) is computed so as to reduce the deviation (steps 1401 to 1404).

Then, the fuel injection quantity of each cylinder is corrected on the basis of the cylinder air-fuel ratio correction quantity AFCQ of each cylinder (step S1405). That is, the cylinder air-fuel ratio control for correcting a fuel injection quantity of each cylinder on the basis of the cylinder air-fuel ratio correction quantity AFCQ to reduce a variation in the air-fuel ratio between the cylinders is performed.

Figure 16:
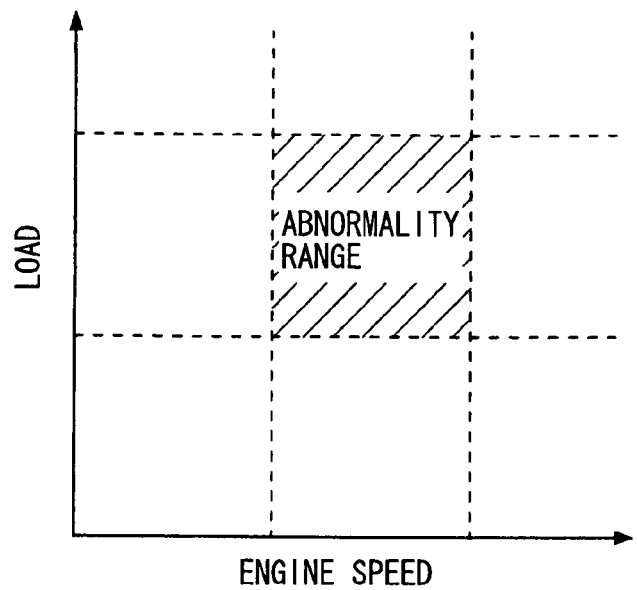
FIG. 16 is a diagram showing an abnormality detection operating range.
Figure 17:
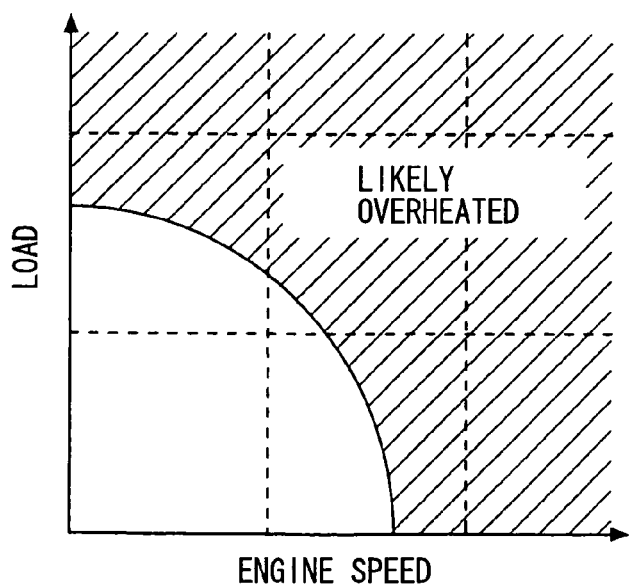
FIG. 17 is a diagram showing an operating range in which a catalyst is highly likely to be overheated.

Then, the routine proceeds to step S1406 where it is determined whether the deviation between the estimated air-fuel ratio of each cylinder and the reference air-fuel ratio is the lean-side abnormality determination value or more to detect a cylinder in which the deviation between the estimated air-fuel ratio and the reference air-fuel ratio is the lean-side abnormality determination value or more (in other words, air-fuel ratio is greatly varied in the lean direction) as a lean abnormal cylinder. At this time, as shown in FIG. 16, a lean abnormal cylinder is detected in each of a plurality of engine operating ranges divided according to the engine revolution speed and load. The engine operating range in which the lean abnormal cylinder is detected is assumed as an abnormality detection operating range.

Then, the routine proceeds to step S1407 where it is determined on the basis of the detection result in the step S1406 whether a lean abnormal cylinder is developed in any engine operating range. If it is determined that a lean abnormal cylinder is developed in any engine operating range, the routine proceeds to step S1408 where it is determined whether the present operating range is an abnormality detection operating range (engine operating range determined to have a lean abnormal cylinder developed).

If it is determined in this step S1408 that the present operating range is an abnormality detection operating range, the routine proceeds to step S1409 where it is determined whether the catalyst 38 is likely to be overheated (to be brought into a state where the catalyst 38 is damaged by heat) by whether, for example, any one of the following conditions (1) and (2) is satisfied.
(1) Two or more lean abnormal cylinders are developed.
(2) The catalyst 38 is in an operating range in which the catalyst 38 is likely to be overheated (for example, in a high rotation operating range or high load operating range shown in FIG. 17).

If any one of the foregoing conditions (1) and (2) is satisfied, it is determined that the catalyst 38 is likely to be overheated. However, if any one of the foregoing conditions (1) and (2) is not satisfied, it is determined that the catalyst 38 is not likely to be overheated.

In other words, when two or more lean abnormal cylinders are developed, the air-fuel ratio of exhaust gas flowing into the catalyst 38 is greatly shifted in the lean direction to increase the oxygen quantity flowing into the catalyst 38 to accelerate oxidation reaction to increase the possibility that the catalyst 38 will be overheated by the reaction heat. Thus, when two or more lean abnormal cylinders are developed, it can be determined that the catalyst 38 is likely to be overheated by the reaction heat.

Moreover, since an exhaust gas quantity flowing into the catalyst 38 is increased in the high rotation operating range and the high load operating range in which the intake air quantity of the engine 11 is large, even if only one lean abnormal cylinder is developed, the oxygen quantity flowing into the catalyst 38 is increased to accelerate the oxidation reaction to increase the possibility that the catalyst 38 will be overheated by the reaction heat. Thus, it is determined that there is a possibility that the catalyst 38 will be overheated in the high rotation operating range and in the high load operating range.

If it is determined in the step S1408 that the present engine operating range is the abnormality detection operating range and it is determined in the step S1409 that the catalyst 38 is likely to be overheated, the routine proceeds to step S1410 where the routine for limited operation control shown in FIG. 13 or FIG. 14 is performed. By performing the limited operation control for limiting the engine output or the engine revolution speed, the exhaust gas quantity (oxygen quantity) flowing into the catalyst 38 is limited to prevent the reaction heat from being produced to such an extent that the catalyst 38 is overheated and to bring the engine operating range outside the abnormality detection operating range.

On the other hand, if it is determined in the step S1408 that the present engine operating range is not the abnormality detection operating range or it is determined in the step S1409 that the catalyst 38 is not likely to be overheated, this routine is finished without performing the limited operation control.

Figure 18:
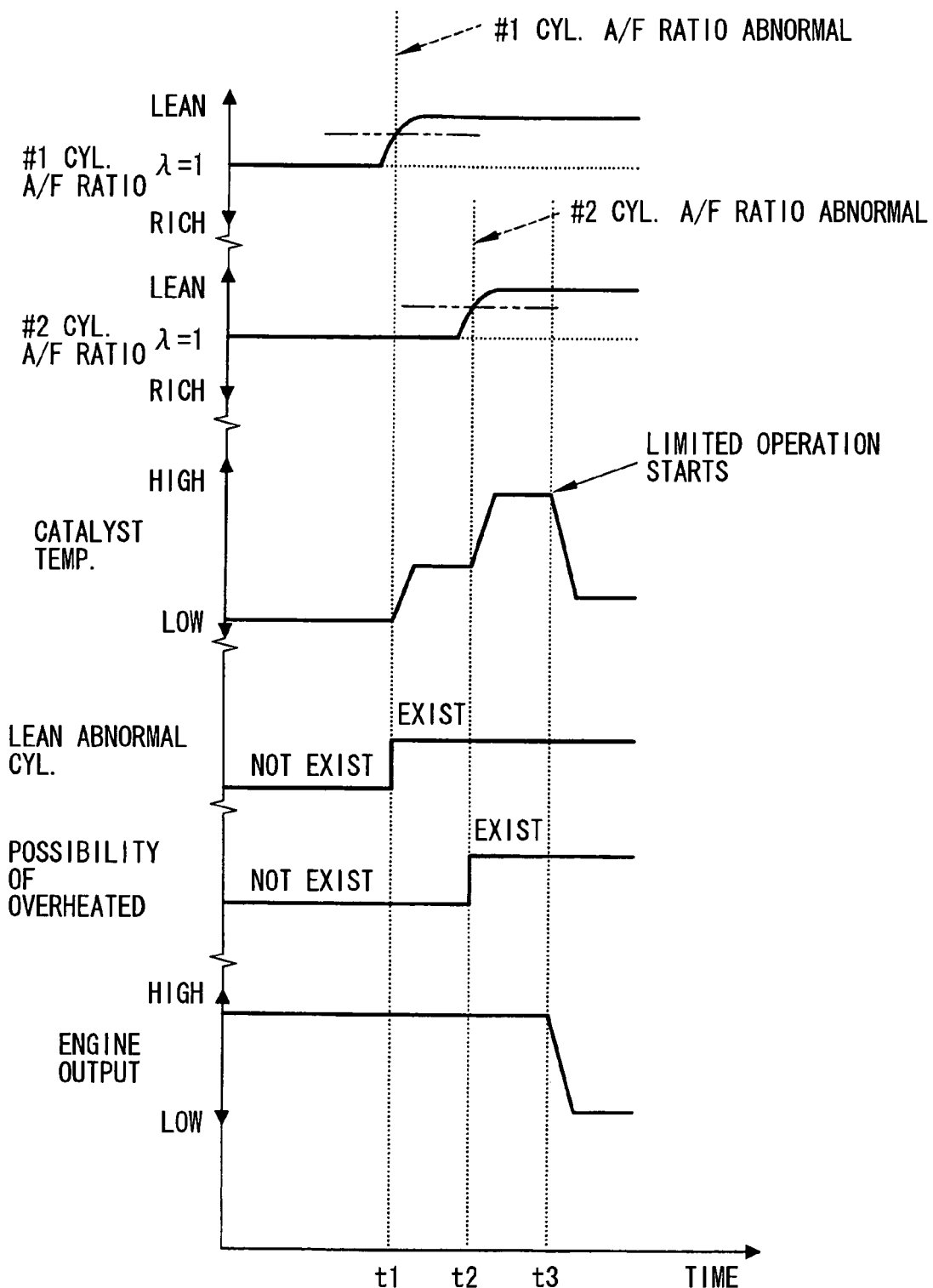
FIG. 18 is a time chart showing a control example according to the seventh embodiment.

A control example of the foregoing seventh embodiment will be described with reference to a time chart shown in FIG. 18. When the air-fuel ratio of the cylinder #1 of the cylinders #1 to #4 is greatly varied in the lean direction by the failure of the fuel injection valve 20 of the cylinder #1, at time t1 when the deviation between the estimated air-fuel ratio of the cylinder #1 and the reference air-fuel ratio becomes larger than the lean-side abnormality determination value, it is determined that a lean abnormal cylinder is developed. Further, at time t2 when the deviation between the estimated air-fuel ratio of the cylinder #2 and the reference air-fuel ratio becomes larger than the lean-side abnormality determination value and hence two lean abnormal cylinders are developed, it is determined that the catalyst 38 is likely to be overheated (to be damaged by heat). Then, at time t3 when it is determined that the engine output is a specified value or more, the limited operation control for limiting the engine output is started to limit the exhaust gas quantity (oxygen quantity) flowing into the catalyst 38 to prevent reaction heat from being produced to such an extent that the catalyst 38 is overheated.

In the foregoing seventh embodiment, when it is determined that the lean abnormal cylinder is developed, if it is determined that the present operating range is the abnormality detection operating range and that the catalyst 38 is likely to be overheated, the limited operation control is performed. Thus, it is possible to surely prevent the catalyst 38 from being overheated. Further, even when it is determined that an abnormal cylinder is developed, if it is determined that the catalyst 38 is not likely to be overheated or that the present operating range is outside the abnormality detection operating range, the limited operation control is not performed. Thus, it is possible to avoid drivability from being reduced by the limited operation control.

In the foregoing embodiments 5 to 7, only any one of the engine output and the engine revolution speed is limited in the limited operation control. However, both of the engine output and the engine revolution speed may be limited.

Moreover, in the foregoing embodiments 5 to 7, when it is determined that there is developed a lean abnormal cylinder in which the air-fuel ratio is greatly varied in the lean direction, the limited operation control is performed. However, when it is determined that there is developed a rich abnormal cylinder in which the air-fuel ratio is greatly varied in a rich direction, the limited operation control may be performed.

Moreover, in the foregoing embodiments 5 to 7, the present invention is applied to a system in which the air-fuel ratio of each cylinder is estimated on the basis of the output of one air-fuel ratio sensor disposed in the exhaust join portion. However, the present invention may be applied to a system in which the air-fuel ratio sensors are disposed in the exhaust manifolds of the respective cylinders and in which the air-fuel ratios of the respective cylinders are measured on the basis of the outputs of the air-fuel ratio sensors.

Eighth Embodiment

In an eighth embodiment, the ECU 40 determines on the basis of a cylinder air-fuel ratio whether an abnormal cylinder is developed in which a variation in the air-fuel ratio is abnormally large. Then, when the ECU 40 determines that an abnormal cylinder is developed, the ECU 40 determines whether the catalyst 38 is likely to be overheated. If the ECU 40 determines that the catalyst 38 is likely to be overheated, the ECU 40 controls the air-fuel ratio of the normal cylinders other than the abnormal cylinder in a rich direction in such a way that the air-fuel ratio of the exhaust gas flowing into the catalyst 38 becomes close to a stoichiometric air-fuel ratio or a rich air-fuel ratio, thereby preventing the catalyst 38 from being overheated.

Figure 19:
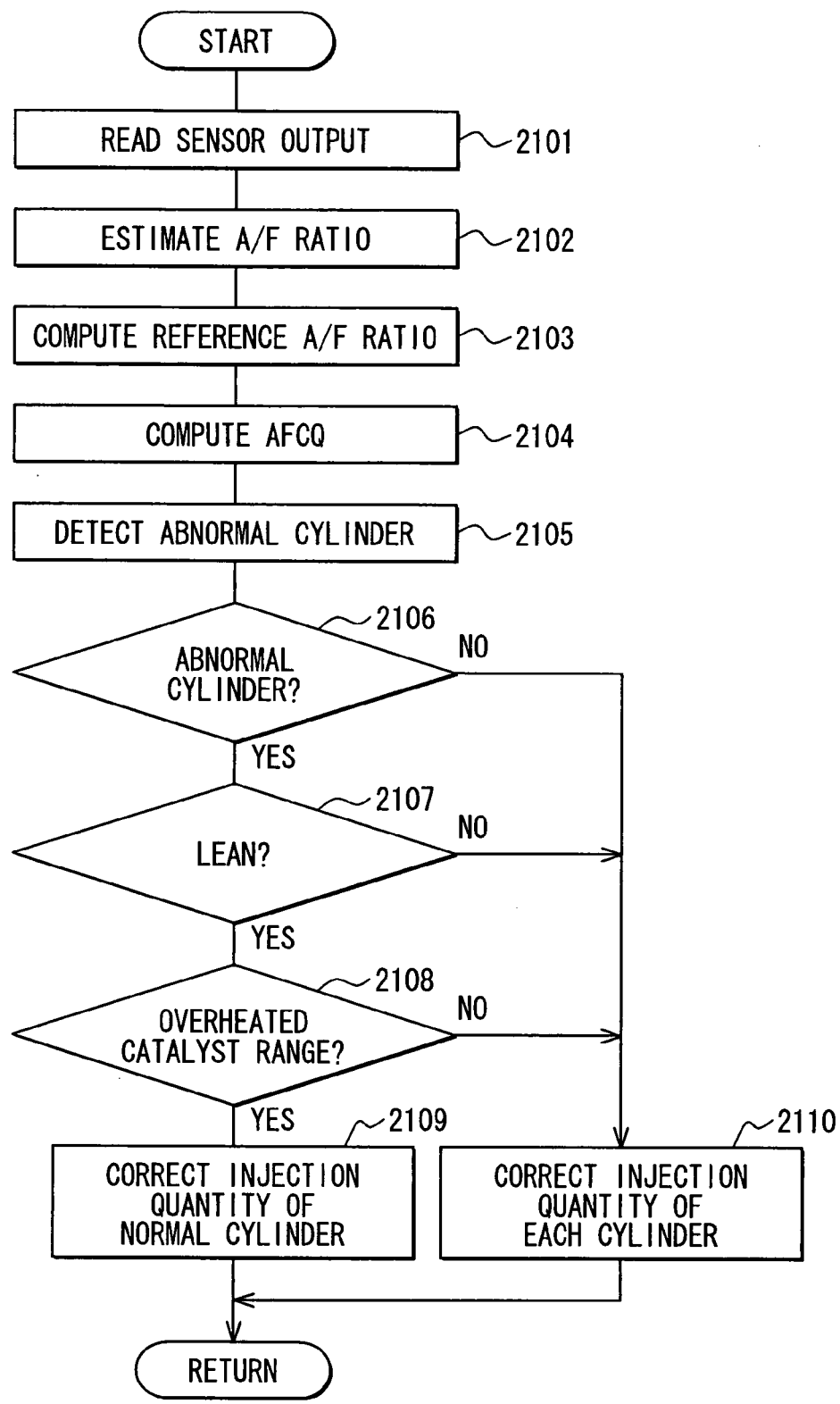
FIG. 19 is a flow chart showing a process for cylinder air-fuel ratio control and catalyst overheat prevention control.

The cylinder air-fuel ratio control and the catalyst overheat prevention control are performed by the ECU 40 along a routine for cylinder air-fuel ratio control and catalyst overheat prevention control shown in FIG. 19. The processing contents of the routine shown in FIG. 19 will be described below.

[Routine for Cylinder Air-Fuel Ratio Control and Catalyst Overheat Prevention Control]

The routine for cylinder air-fuel ratio control and catalyst overheat prevention control shown in FIG. 19 is started at intervals of a specified crank angle (for example, 30° CA) in synchronization with the output pulse of the crank angle sensor 33. When this routine is started, first in step S2101, the output of the air-fuel ratio sensor 37 (detection value of the air-fuel ratio) is read. Then, the routine proceeds to step S2102 where the air-fuel ratio of a cylinder is estimated on the detection value of the air-fuel ratio sensor 37 by the use of the cylinder air-fuel ratio estimation model.

Then, the routine proceeds to step S2103 where an average value of estimated air-fuel ratios of all cylinders is computed and where the average is set as a reference air-fuel ratio (target air-fuel ratio of all cylinders). Then, the routine proceeds to step S2104 where the deviation between the estimated air-fuel ratio of each cylinder and the reference air-fuel ratio is computed and where a cylinder air-fuel ratio correction quantity AFCQ (fuel correction quantity of each cylinder) is computed so as to reduce the deviation.

Then, the routine proceeds to step S2105 where it is determined whether the absolute value of the deviation between the estimated air-fuel ratio of each cylinder and the reference air-fuel ratio is an abnormality determination value or more to detect a cylinder in which the absolute value of the deviation between the estimated air-fuel ratio of each cylinder and the reference air-fuel ratio is an abnormality determination value or more as an abnormal cylinder. Then, the routine proceeds to step S2106 where it is determined whether an abnormal cylinder is developed on the basis of the detection result of the step S2105.

If it is determined in the step S2106 that an abnormal cylinder is not developed, the routine proceeds to step S2110 where the fuel injection quantity of each cylinder is corrected on the basis of the cylinder air-fuel ratio correction quantity AFCQ of each cylinder. That is, the cylinder air-fuel ratio control for correcting a fuel injection quantity of each cylinder on the basis of the cylinder air-fuel ratio correction quantity AFCQ to reduce the variation in the air-fuel ratio between the cylinders is performed.

In contrast to this, if it is determined in the step S2106 that an abnormal cylinder is developed, it is determined in the next steps 2107 and 2108 by the following manner whether the catalyst 38 is likely to be overheated.

First, in step S2107, whether the air-fuel ratio of the abnormal cylinder is lean is determined by whether the estimated air-fuel ratio of the abnormal cylinder is leaner than a specified value. If it is determined that the air-fuel ratio of the abnormal cylinder is lean, the routine proceeds to step S2108 where the present operating range is an operating range in which the catalyst 38 is likely to be overheated (for example, high load operating range).

If it is determined in the step S2107 that the air-fuel ratio of the abnormal cylinder is lean and it is determined in the step S2108 that the present operating range is an operating range in which the catalyst 38 is likely to be overheated (for example, high load operating range), it is determined that there is a possibility that the catalyst 38 will be overheated.

In other words, when the air-fuel ratio of the abnormal cylinder is greatly varied in the lean direction, the air-fuel ratio of the exhaust gas flowing into the catalyst 38 is shifted in the lean direction and further the exhaust gas quantity flowing into the catalyst 38 is increased in the high load operating range in which the intake air quantity of the engine 11 is large, so the oxygen quantity flowing into the catalyst 38 is increased to accelerate oxidation reaction to increase the possibility that the catalyst 38 will be overheated by the reaction heat. Thus, when the air-fuel ratio of the abnormal cylinder is lean and the present operating range is in the high load operating range, it can be determined that the catalyst 39 is likely to be overheated.

If it is determined in the steps 2107 and 2108 that the catalyst 38 is likely to be overheated, the routine proceeds to step S2109 where the fuel injection quantities of the normal cylinders other than the abnormal cylinder are increased and corrected so as to bring the average air-fuel ratio of all cylinders to a stoichiometric air-fuel ratio or a rich air-fuel ratio, whereby the air-fuel ratio is controlled in the rich direction. With this, the air-fuel ratio of the exhaust gas flowing into the catalyst 38 (in other words, exhaust gas of a mixture of the exhaust gas from the abnormal cylinder and the exhaust gas from the normal cylinders) is controlled to the stoichiometric air-fuel ratio or the rich air-fuel ratio (that is, in a direction to reduce a catalyst temperature).

[C0038]

In this case, when only a fuel increase correction quantity for a part of the plurality of normal cylinders is increased, there is a possibility that torque variation and misfire will be developed. Thus, the fuel increase correction quantities of the normal cylinders are made equal to each other and the fuel increase correction quantity per one cylinder is decreased, whereby the torque variation and misfire can be prevented. However, it is not necessarily to make the fuel increase correction quantities of the normal cylinders nearly equal to each other, the fuel increase correction quantities of the normal cylinders may be set to different values.

On the other hand, if it is determined in step S2107 that the air-fuel ratio of the abnormal cylinder is rich or it is determined in step S2108 that the present operating range is in an operating range in which the catalyst 38 is less likely to be overheated (for example, low load operating range or idling operating range), it is determined that the catalyst is not likely to be overheated.

In other words, when the air-fuel ratio of the abnormal cylinder is greatly varied in the rich direction, the air-fuel ratio of the exhaust gas flowing into the catalyst 38 is shifted in the rich direction, so the oxygen quantity flowing into the catalyst 38 is decreased and hence reaction heat is not produced to such an extent that the catalyst 38 is overheated. Thus, when the air-fuel ratio of the abnormal cylinder is rich, it can be determined that the catalyst 38 is not likely to be overheated.

Moreover, in the low load operating range and the idling operating range in which the intake air quantity of the engine 11 is small, even if the air-fuel ratio of the exhaust gas flowing into the catalyst 38 is lean, the exhaust gas quantity (oxygen quantity) flowing into the catalyst 38 is small and hence reaction heat is not produced to such an extent that the catalyst 38 is overheated. Thus, it can be determined that the catalyst 38 is not likely to be overheated.

If it is determined in the steps 2107 and 2108 that the catalyst 38 is not likely to be overheated, the routine proceeds to step S2110 where normal cylinder air-fuel ratio control is performed.

Figure 20:
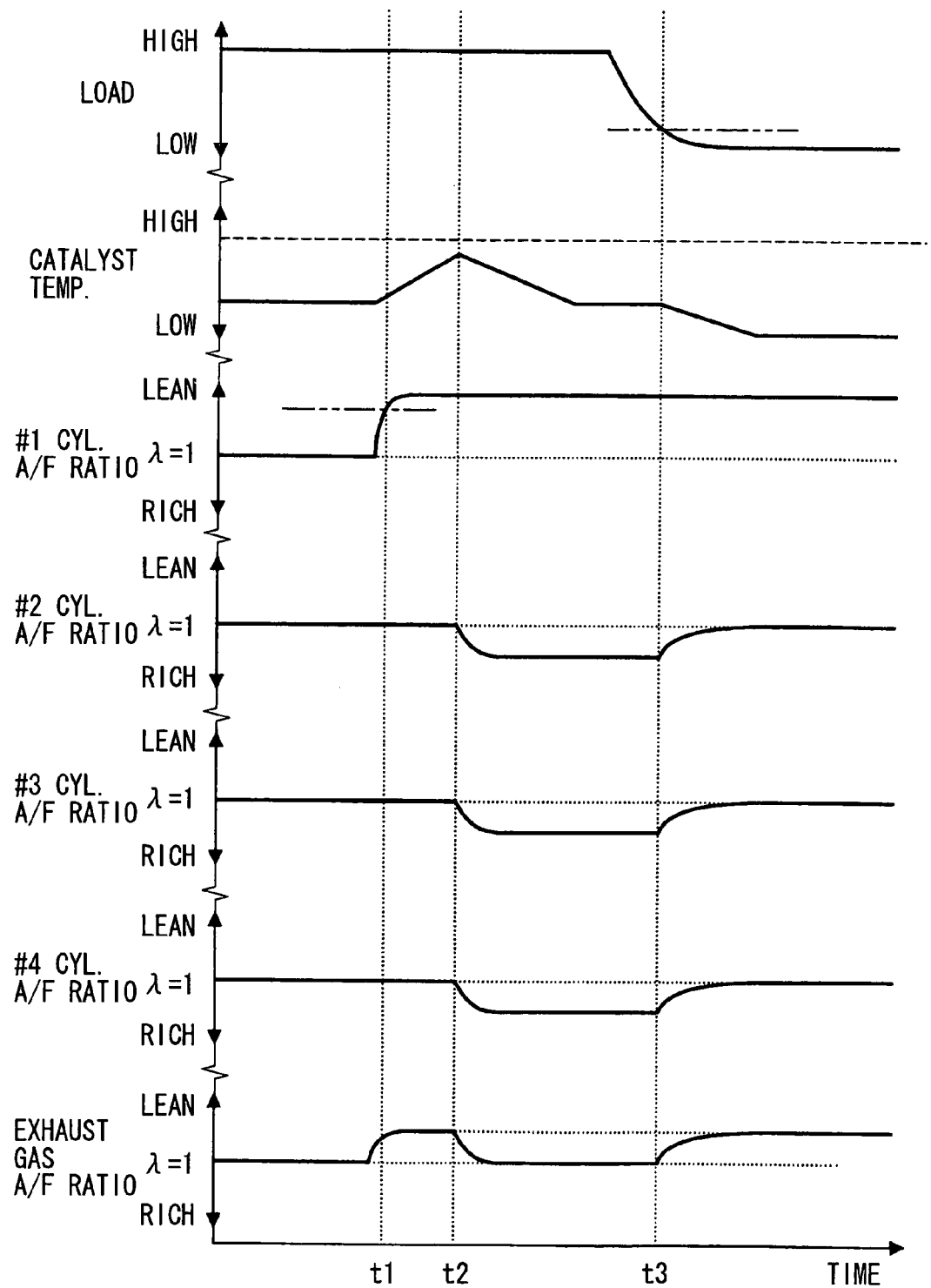
FIG. 20 is a time chart showing a control according to an eighth embodiment.

A control example of the foregoing eighth embodiment will be described with reference to a time chart shown in FIG. 20. When the air-fuel ratio of the cylinder #1 of the cylinders #1 to #4 is greatly varied in the lean direction by the failure of the fuel injection valve 20 of the cylinder #1, at time t1 when the absolute value of the deviation between the estimated air-fuel ratio of the cylinder #1 and the reference air-fuel ratio becomes larger than an abnormality determination value, it is determined that an abnormal cylinder is developed. Further, at time t2 when it is determined that the air-fuel ratio of the abnormal cylinder (#1) is lean and when it is determined that the present operating range is an operating range in which the catalyst 38 is likely to be overheated (for example, high load operating range), it is determined that the catalyst 38 is likely to be overheated. Then, the fuel injection quantities of the normal cylinders (cylinder #2 to cylinder #4) are increased and corrected in such a way that the average air-fuel ratio of all cylinders (cylinder #1 to cylinder #4) becomes close to a stoichiometric air-fuel ratio or a rich air-fuel ratio to control the air-fuel ratio in the rich direction. Thus, the air-fuel ratio of the exhaust gas flowing into the catalyst 38 is controlled close to the stoichiometric air-fuel ratio or the rich air-fuel ratio (in other words, in a direction to decrease the catalyst temperature).

Then, at time t3 when it is determined that the present operating range is an operating range in which the catalyst 38 is less likely to be overheated (for example, low load operating range or idling range), it is determined that the catalyst 38 is not likely to be overheated and the normal cylinder air-fuel ratio control is performed.

In the foregoing eighth embodiment, when it is determined that the abnormal cylinder is developed and that the catalyst 38 is likely to be overheated, the air-fuel ratios of the normal cylinders (an air-fuel ratio control can be normally controlled) are controlled in the rich direction in a state in which the air-fuel ratio of the abnormal cylinder (for which the air-fuel ratio control is difficult) is fixed to control the air-fuel ratio of the exhaust gas flowing into the catalyst 38 close to the stoichiometric air-fuel ratio or the rich air-fuel ratio (in other words, in a direction to decrease the catalyst temperature). Thus, the air-fuel ratio of the exhaust gas flowing into the catalyst 38 can be controlled in the direction to decrease the catalyst temperature quickly and with high accuracy. Therefore, it is possible to prevent the catalyst from being overheated and hence to improve the effect of preventing the catalyst 38 from being overheated.

Moreover, in the eighth embodiment, even if it is determined that the abnormal cylinder is developed, when the air-fuel ratio of the abnormal cylinder is rich, it is determined that the catalyst is not likely to be overheated and hence it is prevented to control the air-fuel ratios of the normal cylinders in the rich direction (in the direction to increase fuel). Further, even if it is determined that the abnormal cylinder is developed and the air-fuel ratio of the abnormal cylinder is lean, it is determined that the catalyst is not likely to be overheated in the low load operating range or the idling operating range and hence it is prevented to control the air-fuel ratios of the normal cylinders in the rich direction (in the direction to increase fuel). With this, it is possible to prevent the fuel injection quantity from being increased and corrected uselessly and hence to prevent fuel consumption from being decreased.

In the foregoing embodiment, when the air-fuel ratio of the abnormal cylinder is lean and the present operating range is the operating range in which the catalyst 38 is highly likely to be overheated (for example, high load operating range), it is determined that the catalyst is likely to be overheated. However, it may be determined that when the air-fuel ratio of the abnormal cylinder is lean irrespective of the operating range, the catalyst 38 is likely to be overheated.

Further, the present invention is not limited to an intake port injection engine but can be variously modified for implementation without departing from the spirit of the invention, for example, can be applied to a cylinder injection engine.

What is claimed is:

1. A control apparatus for an internal combustion engine comprising:

an air-fuel ratio detection means for estimating or measuring a cylinder air-fuel ratio of each cylinder on the basis of an output of an air-fuel ratio sensor detecting an air-fuel ratio of exhaust gas of the internal combustion engine;

a catalyst disposed downstream of the air-fuel ratio sensor and cleaning the exhaust gas;

an abnormal cylinder determination means for determining on the basis of the cylinder air-fuel ratio whether an abnormal cylinder in which an air-fuel ratio is abnormal exists;

a catalyst overheat determination means for determining whether the catalyst is likely to be overheated when the abnormal cylinder determination means determines that the abnormal cylinder exists; and a catalyst overheat prevention means for controlling an air-fuel ratio of a normal cylinder other than the abnormal cylinder in such a way that an air-fuel ratio of the exhaust gas flowing into the catalyst becomes close to a stoichiometric air-fuel ratio or a rich air-fuel ratio when the catalyst overheat determination means determines that the catalyst is likely to be overheated, wherein the catalyst overheat determination means determines that the catalyst is likely to be overheated when an air-fuel ratio of the abnormal cylinder is lean.

2. A control apparatus for an internal combustion engine comprising:

an air-fuel ratio detection means for estimating or measuring a cylinder air-fuel ratio of each cylinder on the basis of an output of an air-fuel ratio sensor detecting an air-fuel ratio of exhaust gas of the internal combustion engine;

a catalyst disposed downstream of the air-fuel ratio sensor and cleaning the exhaust gas;

an abnormal cylinder determination means for determining on the basis of the cylinder air-fuel ratio whether an abnormal cylinder in which an air-fuel ratio is abnormal exists;

a catalyst overheat determination means for determining whether the catalyst is likely to be overheated when the abnormal cylinder determination means determines that the abnormal cylinder exists; and a catalyst overheat prevention means for controlling an air-fuel ratio of a normal cylinder other than the abnormal cylinder in such a way that an air-fuel ratio of the exhaust gas flowing into the catalyst becomes close to a stoichiometric air-fuel ratio or a rich air-fuel ratio when the catalyst overheat determination means determines that the catalyst is likely to be overheated, wherein the catalyst overheat determination means determines that the catalyst is not likely to be overheated when the internal combustion engine is in a low load operating range or in an idling operating range.

3. A method for controlling an internal combustion engine comprising:

estimating or measuring a cylinder air-fuel ratio of each cylinder on the basis of an output of an air-fuel ratio sensor detecting an air-fuel ratio of exhaust gas of the internal combustion engine;

cleaning the exhaust gas with a catalyst disposed downstream of the air-fuel ratio sensor;

determining on the basis of the cylinder air-fuel ratio whether an abnormal cylinder in which an air-fuel ratio is abnormal exists;

determining whether the catalyst is likely to be overheated when it is determined that the abnormal cylinder exists; and controlling an air-fuel ratio of a normal cylinder other than the abnormal cylinder in such a way that an air-fuel ratio of the exhaust gas flowing into the catalyst becomes close to a stoichiometric air-fuel ratio or a rich air-fuel ratio when it is determined that the catalyst is likely to be overheated to prevent the catalyst from overheating, wherein it is determined that the catalyst is likely to be overheated when an air-fuel ratio of the abnormal cylinder is lean.

4. A method for controlling an internal combustion engine comprising:

estimating or measuring a cylinder air-fuel ratio of each cylinder on the basis of an output of an air-fuel ratio sensor detecting an air-fuel ratio of exhaust gas of the internal combustion engine;

cleaning the exhaust gas with a catalyst disposed downstream of the air-fuel ratio sensor;

determining on the basis of the cylinder air-fuel ratio whether an abnormal cylinder in which an air-fuel ratio is abnormal exists;

determining whether the catalyst is likely to be overheated when it is determined that the abnormal cylinder exists; and controlling an air-fuel ratio of a normal cylinder other than the abnormal cylinder in such a way that an air-fuel ratio of the exhaust gas flowing into the catalyst becomes close to a stoichiometric air-fuel ratio or a rich air-fuel ratio when it is determined that the catalyst is likely to be overheated to prevent the catalyst from overheating, wherein it is determined that the catalyst is not likely to be overheated when the internal combustion engine is in a low load operating range or in an idling operating range.

* * * * *

UNITED STATES PATENT AND TRADEMARK OFFICE
CERTIFICATE OF CORRECTION

PATENT NO. : 7,707,822 B2 Page 1 of 1
APPLICATION NO. : 11/819657
DATED : May 4, 2010
INVENTOR(S) : Sakamoto It is certified that error appears in the above-identified patent and that said Letters Patent is hereby corrected as shown below:

On the Title Page, Item (75) Inventors: should read, Yuuki Sakamoto, Kariya (JP)

Signed and Sealed this

Fifteenth Day of June, 2010

David J. Kappos
*Director of the United States Patent and Trademark Office*